US008812493B2

(12) United States Patent
Tankovich et al.

(10) Patent No.: US 8,812,493 B2
(45) Date of Patent: Aug. 19, 2014

(54) SEARCH RESULTS RANKING USING EDITING DISTANCE AND DOCUMENT INFORMATION

(75) Inventors: Vladimir Tankovich, Bellevue, WA (US); Hang Li, Beijing (CN); Dmitriy Meyerzon, Bellevue, WA (US); Jun Xu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 12/101,951

(22) Filed: Apr. 11, 2008

(65) Prior Publication Data

US 2009/0259651 A1 Oct. 15, 2009

(51) Int. Cl.
*G06F 7/00* (2006.01)

(52) U.S. Cl.
USPC .......................................................... 707/722

(58) Field of Classification Search
USPC ..................... 707/722, 728, 999.001, 999.003
See application file for complete search history.

(56) References Cited

U.S. PATENT DOCUMENTS

| 5,222,236 A | 6/1993 | Potash et al. |
| 5,257,577 A | 11/1993 | Clark |
| 5,321,833 A | 6/1994 | Chang et al. |
| 5,369,778 A | 11/1994 | San Soucie et al. |
| 5,544,360 A | 8/1996 | Lewak et al. |
| 5,594,660 A | 1/1997 | Sung et al. |
| 5,606,609 A | 2/1997 | Houser et al. |
| 5,634,124 A | 5/1997 | Khoyi et al. |
| 5,729,730 A | 3/1998 | Wlaschin et al. |
| 5,765,150 A | 6/1998 | Burrows |
| 5,826,269 A | 10/1998 | Hussey |
| 5,828,999 A | 10/1998 | Bellegarda et al. |

(Continued)

FOREIGN PATENT DOCUMENTS

| CA | 2279119 | 1/2001 |
| DE | 10029644 A1 | 1/2002 |

(Continued)

OTHER PUBLICATIONS

Ncik Creswell, Stephen Robertson, Hugo Zaragoza and Michael Taylor, Relevance Weighting for Query Independent Evidence, Aug. 15-19, 2005, ACM, p. 416-423.*

(Continued)

*Primary Examiner* — Rehana Perveen
*Assistant Examiner* — Hung Havan
(74) *Attorney, Agent, or Firm* — Tom Wong; Jim Ross; Micky Minhas

(57) ABSTRACT

Architecture for extracting document information from documents received as search results based on a query string, and computing an edit distance between the data string and the query string. The edit distance is employed in determining relevance of the document as part of result ranking by detecting near-matches of a whole query or part of the query. The edit distance evaluates how close the query string is to a given data stream that includes document information such as TAUC (title, anchor text, URL, clicks) information, etc. The architecture includes the index-time splitting of compound terms in the URL to allow the more effective discovery of query terms. Additionally, index-time filtering of anchor text is utilized to find the top N anchors of one or more of the document results. The TAUC information can be input to a neural network (e.g., 2-layer) to improve relevance metrics for ranking the search results.

20 Claims, 12 Drawing Sheets

(56) References Cited

U.S. PATENT DOCUMENTS

| | | |
|---|---|---|
| 5,848,404 A | 12/1998 | Hafner et al. |
| 5,870,739 A | 2/1999 | Davis, III et al. |
| 5,870,740 A | 2/1999 | Rose et al. |
| 5,890,147 A | 3/1999 | Peltonen et al. |
| 5,893,092 A | 4/1999 | Driscoll |
| 5,893,116 A | 4/1999 | Simmonds et al. |
| 5,905,866 A | 5/1999 | Nakabayashi et al. |
| 5,913,210 A | 6/1999 | Call |
| 5,920,859 A | 7/1999 | Li |
| 5,933,822 A | 8/1999 | Braden-Harder et al. |
| 5,933,851 A | 8/1999 | Kojima et al. |
| 5,943,670 A | 8/1999 | Prager |
| 5,956,722 A | 9/1999 | Jacobson et al. |
| 5,960,383 A | 9/1999 | Fleischer |
| 5,983,216 A | 11/1999 | Kirsch et al. |
| 5,987,457 A | 11/1999 | Ballard |
| 6,006,225 A | 12/1999 | Bowman et al. |
| 6,012,053 A | 1/2000 | Pant et al. |
| 6,026,398 A | 2/2000 | Brown et al. |
| 6,029,164 A | 2/2000 | Birrell et al. |
| 6,032,196 A | 2/2000 | Monier |
| 6,038,610 A | 3/2000 | Belfiore et al. |
| 6,041,323 A | 3/2000 | Kubota |
| 6,070,158 A | 5/2000 | Kirsch et al. |
| 6,070,191 A | 5/2000 | Narendran et al. |
| 6,098,064 A | 8/2000 | Pirolli et al. |
| 6,115,709 A | 9/2000 | Gilmour et al. |
| 6,125,361 A | 9/2000 | Chakrabarti et al. |
| 6,128,701 A | 10/2000 | Malcolm et al. |
| 6,145,003 A | 11/2000 | Sanu et al. |
| 6,151,624 A | 11/2000 | Teare et al. |
| 6,167,369 A | 12/2000 | Schulze |
| 6,167,402 A | 12/2000 | Yeager |
| 6,178,419 B1 | 1/2001 | Legh-Smith et al. |
| 6,182,065 B1 | 1/2001 | Yeomans |
| 6,182,067 B1 | 1/2001 | Presnell et al. |
| 6,182,085 B1 | 1/2001 | Eichstaedt et al. |
| 6,182,113 B1 | 1/2001 | Narayanaswami |
| 6,185,558 B1 | 2/2001 | Bowman et al. |
| 6,199,081 B1 | 3/2001 | Meyerzon et al. |
| 6,202,058 B1 | 3/2001 | Rose et al. |
| 6,208,988 B1 | 3/2001 | Schultz |
| 6,216,123 B1 | 4/2001 | Robertson et al. |
| 6,222,559 B1 | 4/2001 | Asano et al. |
| 6,240,407 B1 | 5/2001 | Chang et al. |
| 6,240,408 B1 | 5/2001 | Kaufman |
| 6,247,013 B1 | 6/2001 | Morimoto |
| 6,263,364 B1 | 7/2001 | Najork et al. |
| 6,269,370 B1 | 7/2001 | Kirsch |
| 6,272,507 B1 | 8/2001 | Pirolli et al. |
| 6,285,367 B1 | 9/2001 | Abrams et al. |
| 6,285,999 B1 | 9/2001 | Page |
| 6,304,864 B1 | 10/2001 | Liddy et al. |
| 6,314,421 B1 | 11/2001 | Sharnoff et al. |
| 6,317,741 B1 | 11/2001 | Burrows |
| 6,324,551 B1 | 11/2001 | Lamping et al. |
| 6,326,962 B1 | 12/2001 | Szabo |
| 6,327,590 B1 | 12/2001 | Chidlovskii et al. |
| 6,336,117 B1 | 1/2002 | Massarani et al. |
| 6,349,308 B1 | 2/2002 | Whang et al. |
| 6,351,467 B1 | 2/2002 | Dillon |
| 6,351,755 B1 | 2/2002 | Najork et al. |
| 6,360,215 B1 | 3/2002 | Judd et al. |
| 6,381,597 B1 | 4/2002 | Lin |
| 6,385,602 B1 | 5/2002 | Tso et al. |
| 6,389,436 B1 | 5/2002 | Chakrabarti et al. |
| 6,415,319 B1 | 7/2002 | Ambroziak |
| 6,418,433 B1 | 7/2002 | Chakrabarti et al. |
| 6,418,452 B1 | 7/2002 | Kraft et al. |
| 6,418,453 B1 | 7/2002 | Kraft et al. |
| 6,424,966 B1 | 7/2002 | Meyerzon et al. |
| 6,442,606 B1 | 8/2002 | Subbaroyan et al. |
| 6,473,752 B1 | 10/2002 | Fleming |
| 6,484,204 B1 | 11/2002 | Rabinovich |
| 6,516,312 B1 | 2/2003 | Kraft et al. |
| 6,526,440 B1 | 2/2003 | Bharat |
| 6,539,376 B1 | 3/2003 | Sundaresan et al. |
| 6,546,388 B1 | 4/2003 | Edlund et al. |
| 6,547,829 B1 | 4/2003 | Meyerzon et al. |
| 6,549,896 B1 | 4/2003 | Candan et al. |
| 6,549,897 B1 | 4/2003 | Katariya et al. |
| 6,553,364 B1 | 4/2003 | Wu |
| 6,557,036 B1 | 4/2003 | Kavacheri et al. |
| 6,560,600 B1 | 5/2003 | Broder |
| 6,594,682 B2 | 7/2003 | Peterson et al. |
| 6,598,040 B1 | 7/2003 | Cragun et al. |
| 6,598,047 B1 | 7/2003 | Russell et al. |
| 6,598,051 B1 | 7/2003 | Wiener et al. |
| 6,601,075 B1 | 7/2003 | Huang et al. |
| 6,622,140 B1 | 9/2003 | Kantrowitz |
| 6,628,304 B2 | 9/2003 | Mitchell et al. |
| 6,631,369 B1 | 10/2003 | Meyerzon |
| 6,633,867 B1 | 10/2003 | Kraft et al. |
| 6,633,868 B1 | 10/2003 | Min |
| 6,636,853 B1 | 10/2003 | Stephens |
| 6,638,314 B1 | 10/2003 | Meyerzon et al. |
| 6,654,742 B1 | 11/2003 | Kobayashi et al. |
| 6,671,683 B2 | 12/2003 | Kanno |
| 6,678,692 B1 | 1/2004 | Hyatt |
| 6,701,318 B2 | 3/2004 | Fox et al. |
| 6,718,324 B2 | 4/2004 | Edlund et al. |
| 6,718,365 B1 | 4/2004 | Dutta |
| 6,738,764 B2 | 5/2004 | Mao et al. |
| 6,763,362 B2 | 7/2004 | McKeeth |
| 6,766,316 B2 | 7/2004 | Caudill et al. |
| 6,766,422 B2 | 7/2004 | Beyda |
| 6,772,141 B1 | 8/2004 | Pratt et al. |
| 6,775,659 B2 | 8/2004 | Clifton-Bligh |
| 6,775,664 B2 | 8/2004 | Lang et al. |
| 6,778,997 B2 | 8/2004 | Sundaresan et al. |
| 6,829,606 B2 | 12/2004 | Ripley |
| 6,859,800 B1 | 2/2005 | Roche et al. |
| 6,862,710 B1 | 3/2005 | Marchisio |
| 6,868,411 B2 | 3/2005 | Shanahan |
| 6,871,202 B2 | 3/2005 | Broder |
| 6,873,982 B1 | 3/2005 | Bates et al. |
| 6,883,135 B1 | 4/2005 | Obata et al. |
| 6,886,010 B2 | 4/2005 | Kostoff |
| 6,886,129 B1 | 4/2005 | Raghavan et al. |
| 6,898,592 B2 | 5/2005 | Peltonen et al. |
| 6,910,029 B1 | 6/2005 | Sundaresan |
| 6,931,397 B1 | 8/2005 | Sundaresan |
| 6,934,714 B2 | 8/2005 | Meinig |
| 6,944,609 B2 | 9/2005 | Witbrock |
| 6,947,930 B2 | 9/2005 | Anick et al. |
| 6,959,326 B1 | 10/2005 | Day et al. |
| 6,973,490 B1 | 12/2005 | Robertson et al. |
| 6,990,628 B1 | 1/2006 | Palmer et al. |
| 6,999,959 B1 | 2/2006 | Lawrence et al. |
| 7,003,442 B1 | 2/2006 | Tsuda |
| 7,010,532 B1 | 3/2006 | Stakutis et al. |
| 7,016,540 B1 | 3/2006 | Gong et al. |
| 7,028,029 B2 | 4/2006 | Kamvar et al. |
| 7,039,234 B2 | 5/2006 | Geidl et al. |
| 7,051,023 B2 | 5/2006 | Kapur et al. |
| 7,065,523 B2 | 6/2006 | Peltonen et al. |
| 7,072,888 B1 | 7/2006 | Perkins |
| 7,076,483 B2 | 7/2006 | Preda et al. |
| 7,080,073 B1 | 7/2006 | Jiang et al. |
| 7,085,755 B2 | 8/2006 | Bluhm et al. |
| 7,107,218 B1 | 9/2006 | Preston |
| 7,152,059 B2 | 12/2006 | Monteverde |
| 7,181,438 B1 | 2/2007 | Szabo |
| 7,197,497 B2 | 3/2007 | Cossock |
| 7,228,301 B2 | 6/2007 | Meyerzon et al. |
| 7,231,399 B1 | 6/2007 | Bem et al. |
| 7,243,102 B1 | 7/2007 | Naam et al. |
| 7,246,128 B2 | 7/2007 | Jordahl |
| 7,257,574 B2 | 8/2007 | Parikh |
| 7,257,577 B2 | 8/2007 | Fagin et al. |
| 7,260,573 B1 | 8/2007 | Jeh et al. |
| 7,281,002 B2 | 10/2007 | Farrell |
| 7,283,997 B1 | 10/2007 | Howard et al. |
| 7,308,643 B1 | 12/2007 | Zhu et al. |

(56) References Cited

U.S. PATENT DOCUMENTS

| | | | |
|---|---|---|---|
| 7,328,401 B2 | 2/2008 | Obata et al. | |
| 7,346,604 B1 | 3/2008 | Bharat et al. | |
| 7,346,839 B2 | 3/2008 | Acharya et al. | |
| 7,356,530 B2 | 4/2008 | Kim et al. | |
| 7,386,527 B2 | 6/2008 | Harris et al. | |
| 7,415,459 B2 | 8/2008 | Peltonen et al. | |
| 7,428,530 B2 | 9/2008 | Ramarathnam et al. | |
| 7,496,561 B2 | 2/2009 | Caudill et al. | |
| 7,499,919 B2 | 3/2009 | Meyerzon et al. | |
| 7,519,529 B1 | 4/2009 | Horvitz | |
| 7,580,568 B1 | 8/2009 | Wang et al. | |
| 7,584,221 B2 | 9/2009 | Robertson et al. | |
| 7,599,917 B2 | 10/2009 | Meyerzon et al. | |
| 7,603,616 B2 | 10/2009 | Obata et al. | |
| 7,606,793 B2 | 10/2009 | Merrigan et al. | |
| 7,644,107 B2 | 1/2010 | Neagovici-Negoescu et al. | |
| 7,685,084 B2 | 3/2010 | Sisk et al. | |
| 7,689,531 B1 | 3/2010 | Diao et al. | |
| 7,689,559 B2 | 3/2010 | Canright et al. | |
| 7,693,829 B1 | 4/2010 | Alshawi | |
| 7,716,198 B2 | 5/2010 | Meyerzon et al. | |
| 7,716,225 B1 | 5/2010 | Dean et al. | |
| 7,716,226 B2 | 5/2010 | Barney | |
| 7,720,830 B2 | 5/2010 | Wen et al. | |
| 7,739,277 B2 | 6/2010 | Meyerzon | |
| 7,761,448 B2 | 7/2010 | Meyerzon et al. | |
| 7,792,833 B2 | 9/2010 | Meyerzon et al. | |
| 7,827,181 B2 | 11/2010 | Petriuc | |
| 7,840,569 B2 | 11/2010 | Meyerzon et al. | |
| 7,962,462 B1 * | 6/2011 | Lamping et al. | 707/706 |
| 8,082,246 B2 | 12/2011 | Meyerzon et al. | |
| 8,326,829 B2 | 12/2012 | Gupta | |
| 8,370,331 B2 | 2/2013 | Pontier et al. | |
| 8,412,702 B2 | 4/2013 | Cozzi | |
| 8,412,717 B2 | 4/2013 | Liao et al. | |
| 2001/0042076 A1 | 11/2001 | Fukuda | |
| 2002/0016787 A1 | 2/2002 | Kanno | |
| 2002/0026390 A1 | 2/2002 | Ulenas et al. | |
| 2002/0032772 A1 | 3/2002 | Olstad et al. | |
| 2002/0055940 A1 | 5/2002 | Elka | |
| 2002/0062323 A1 | 5/2002 | Takatori et al. | |
| 2002/0078045 A1 | 6/2002 | Dutta | |
| 2002/0083054 A1 | 6/2002 | Peltonen et al. | |
| 2002/0099694 A1 | 7/2002 | Diamond et al. | |
| 2002/0103798 A1 | 8/2002 | Abrol et al. | |
| 2002/0107861 A1 | 8/2002 | Clendinning et al. | |
| 2002/0107886 A1 | 8/2002 | Gentner et al. | |
| 2002/0123988 A1 | 9/2002 | Dean et al. | |
| 2002/0129014 A1 | 9/2002 | Kim et al. | |
| 2002/0129015 A1 | 9/2002 | Caudill et al. | |
| 2002/0165873 A1 | 11/2002 | Kwok et al. | |
| 2002/0168106 A1 | 11/2002 | Trajkovic | |
| 2002/0169595 A1 | 11/2002 | Agichtein et al. | |
| 2002/0169754 A1 | 11/2002 | Mao et al. | |
| 2002/0169770 A1 | 11/2002 | Kim et al. | |
| 2002/0169800 A1 | 11/2002 | Sundaresan et al. | |
| 2003/0004952 A1 | 1/2003 | Nixon et al. | |
| 2003/0028520 A1 | 2/2003 | Alpha | |
| 2003/0037074 A1 | 2/2003 | Dwork et al. | |
| 2003/0046389 A1 | 3/2003 | Thieme | |
| 2003/0053084 A1 | 3/2003 | Geidl et al. | |
| 2003/0055810 A1 | 3/2003 | Cragun et al. | |
| 2003/0061201 A1 | 3/2003 | Grefenstette et al. | |
| 2003/0065706 A1 | 4/2003 | Smyth et al. | |
| 2003/0074368 A1 | 4/2003 | Schuetze et al. | |
| 2003/0088545 A1 | 5/2003 | Subramaniam et al. | |
| 2003/0101183 A1 | 5/2003 | Kabra et al. | |
| 2003/0135490 A1 | 7/2003 | Barrett et al. | |
| 2003/0195882 A1 * | 10/2003 | Lee et al. | 707/5 |
| 2003/0208482 A1 | 11/2003 | Kim et al. | |
| 2003/0217007 A1 | 11/2003 | Fukushima et al. | |
| 2003/0217047 A1 | 11/2003 | Marchisio | |
| 2003/0217052 A1 | 11/2003 | Rubenczyk et al. | |
| 2004/0003028 A1 | 1/2004 | Emmett et al. | |
| 2004/0006559 A1 | 1/2004 | Gange et al. | |
| 2004/0024752 A1 | 2/2004 | Manber et al. | |
| 2004/0049766 A1 | 3/2004 | Bloch et al. | |
| 2004/0064442 A1 | 4/2004 | Popovitch | |
| 2004/0093328 A1 | 5/2004 | Damle | |
| 2004/0111408 A1 | 6/2004 | Caudill et al. | |
| 2004/0117351 A1 | 6/2004 | Challapalli et al. | |
| 2004/0141354 A1 * | 7/2004 | Carnahan | 365/145 |
| 2004/0148278 A1 | 7/2004 | Milo et al. | |
| 2004/0181515 A1 | 9/2004 | Ullmann et al. | |
| 2004/0186827 A1 | 9/2004 | Anick et al. | |
| 2004/0194099 A1 | 9/2004 | Lamping et al. | |
| 2004/0199497 A1 | 10/2004 | Timmons | |
| 2004/0205497 A1 | 10/2004 | Alexander et al. | |
| 2004/0215606 A1 | 10/2004 | Cossock | |
| 2004/0215664 A1 | 10/2004 | Hennings et al. | |
| 2004/0249795 A1 | 12/2004 | Brockway et al. | |
| 2004/0254932 A1 | 12/2004 | Gupta et al. | |
| 2004/0260695 A1 | 12/2004 | Brill | |
| 2004/0267722 A1 | 12/2004 | Larimore et al. | |
| 2005/0033742 A1 | 2/2005 | Kamvar et al. | |
| 2005/0044071 A1 | 2/2005 | Cho et al. | |
| 2005/0055340 A1 | 3/2005 | Dresden | |
| 2005/0055347 A9 | 3/2005 | Cho et al. | |
| 2005/0060186 A1 | 3/2005 | Blowers et al. | |
| 2005/0060304 A1 | 3/2005 | Parikh | |
| 2005/0060310 A1 | 3/2005 | Tong et al. | |
| 2005/0060311 A1 | 3/2005 | Tong et al. | |
| 2005/0071328 A1 | 3/2005 | Lawrence | |
| 2005/0071741 A1 | 3/2005 | Acharya et al. | |
| 2005/0086192 A1 | 4/2005 | Kodama | |
| 2005/0086206 A1 | 4/2005 | Balasubramanian et al. | |
| 2005/0086583 A1 | 4/2005 | Obata et al. | |
| 2005/0089215 A1 | 4/2005 | Staelin et al. | |
| 2005/0114324 A1 | 5/2005 | Mayer | |
| 2005/0125392 A1 | 6/2005 | Curtis et al. | |
| 2005/0144162 A1 | 6/2005 | Liang | |
| 2005/0154710 A1 | 7/2005 | Ruhlow et al. | |
| 2005/0154746 A1 | 7/2005 | Liu et al. | |
| 2005/0165753 A1 | 7/2005 | Chen et al. | |
| 2005/0165781 A1 | 7/2005 | Kraft et al. | |
| 2005/0187965 A1 | 8/2005 | Abajian | |
| 2005/0192936 A1 | 9/2005 | Meek et al. | |
| 2005/0192955 A1 | 9/2005 | Farrell | |
| 2005/0210006 A1 | 9/2005 | Robertson | |
| 2005/0210079 A1 | 9/2005 | Edlund et al. | |
| 2005/0210105 A1 | 9/2005 | Hirata et al. | |
| 2005/0216533 A1 | 9/2005 | Berkhin | |
| 2005/0240580 A1 | 10/2005 | Zamir et al. | |
| 2005/0251499 A1 | 11/2005 | Huang | |
| 2005/0256865 A1 | 11/2005 | Ma et al. | |
| 2005/0262050 A1 | 11/2005 | Fagin et al. | |
| 2005/0283473 A1 | 12/2005 | Rousso et al. | |
| 2005/0289133 A1 | 12/2005 | Arrouye et al. | |
| 2005/0289193 A1 | 12/2005 | Arrouye et al. | |
| 2006/0004732 A1 | 1/2006 | Odom | |
| 2006/0031183 A1 | 2/2006 | Oral et al. | |
| 2006/0036598 A1 | 2/2006 | Wu | |
| 2006/0041521 A1 | 2/2006 | Oral et al. | |
| 2006/0047643 A1 | 3/2006 | Chaman | |
| 2006/0047649 A1 | 3/2006 | Liang | |
| 2006/0059144 A1 | 3/2006 | Canright et al. | |
| 2006/0064411 A1 | 3/2006 | Gross et al. | |
| 2006/0069982 A1 | 3/2006 | Petriuc | |
| 2006/0074781 A1 | 4/2006 | Leano et al. | |
| 2006/0074883 A1 | 4/2006 | Teevan et al. | |
| 2006/0074903 A1 | 4/2006 | Meyerzon et al. | |
| 2006/0095416 A1 | 5/2006 | Barkhin et al. | |
| 2006/0136411 A1 | 6/2006 | Meyerzon et al. | |
| 2006/0149723 A1 | 7/2006 | Finger | |
| 2006/0161534 A1 | 7/2006 | Carson et al. | |
| 2006/0173560 A1 | 8/2006 | Widrow | |
| 2006/0173828 A1 | 8/2006 | Rosenberg | |
| 2006/0195440 A1 | 8/2006 | Burges et al. | |
| 2006/0200460 A1 | 9/2006 | Meyerzon et al. | |
| 2006/0206460 A1 | 9/2006 | Gadkari et al. | |
| 2006/0206476 A1 | 9/2006 | Kapur et al. | |
| 2006/0212423 A1 | 9/2006 | Jones et al. | |
| 2006/0224554 A1 | 10/2006 | Bailey et al. | |
| 2006/0248074 A1 | 11/2006 | Carmel et al. | |

(56) References Cited

U.S. PATENT DOCUMENTS

| | | |
|---|---|---|
| 2006/0259481 A1 | 11/2006 | Handley |
| 2006/0282306 A1 | 12/2006 | Thissen-Roe |
| 2006/0282455 A1 | 12/2006 | Lee et al. |
| 2006/0287993 A1 | 12/2006 | Yao et al. |
| 2006/0294100 A1 | 12/2006 | Meyerzon et al. |
| 2007/0038616 A1 | 2/2007 | Guha |
| 2007/0038622 A1 | 2/2007 | Meyerzon et al. |
| 2007/0050338 A1 | 3/2007 | Strohm et al. |
| 2007/0067284 A1 | 3/2007 | Meyerzon et al. |
| 2007/0073748 A1 | 3/2007 | Barney |
| 2007/0085716 A1 | 4/2007 | Bar-Yossef et al. |
| 2007/0094285 A1 | 4/2007 | Agichtein et al. |
| 2007/0106659 A1 | 5/2007 | Lu et al. |
| 2007/0150473 A1 | 6/2007 | Li et al. |
| 2007/0198459 A1 | 8/2007 | Boone et al. |
| 2007/0260597 A1 | 11/2007 | Cramer |
| 2007/0276829 A1 | 11/2007 | Wang et al. |
| 2008/0005068 A1 | 1/2008 | Dumais et al. |
| 2008/0016053 A1 | 1/2008 | Frieden et al. |
| 2008/0140641 A1 | 6/2008 | Wang |
| 2008/0154888 A1 | 6/2008 | Buron et al. |
| 2008/0195596 A1 | 8/2008 | Sisk et al. |
| 2009/0006356 A1 | 1/2009 | Liao et al. |
| 2009/0006358 A1 | 1/2009 | Morris et al. |
| 2009/0024606 A1 | 1/2009 | Schilit et al. |
| 2009/0070306 A1* | 3/2009 | Stroe et al. .................. 707/4 |
| 2009/0106221 A1 | 4/2009 | Meyerzon et al. |
| 2009/0106223 A1 | 4/2009 | Meyerzon et al. |
| 2009/0106235 A1 | 4/2009 | Tankovich et al. |
| 2009/0157607 A1 | 6/2009 | Tiyyagura |
| 2009/0164929 A1 | 6/2009 | Chen et al. |
| 2009/0240680 A1 | 9/2009 | Tankovich et al. |
| 2009/0276421 A1 | 11/2009 | Qiu |
| 2009/0307209 A1 | 12/2009 | Carmel et al. |
| 2010/0191744 A1 | 7/2010 | Meyerzon et al. |
| 2010/0268707 A1 | 10/2010 | Meyerzon et al. |
| 2011/0106850 A1 | 5/2011 | Li et al. |
| 2011/0137893 A1 | 6/2011 | Shnitko et al. |
| 2011/0235909 A1 | 9/2011 | Chenthamarakshan et al. |
| 2011/0295850 A1 | 12/2011 | Tankovich et al. |
| 2013/0198174 A1 | 8/2013 | Poznanski et al. |

FOREIGN PATENT DOCUMENTS

| | | |
|---|---|---|
| EP | 0950961 A2 | 10/1999 |
| EP | 0950961 A3 | 10/1999 |
| EP | 1050830 A2 | 11/2000 |
| EP | 1120717 A2 | 8/2001 |
| EP | 1282060 A2 | 2/2002 |
| EP | 1462950 | 9/2004 |
| EP | 1557770 A1 | 7/2005 |
| EP | 1862916 | 12/2007 |
| ID | P0027547 | 2/2011 |
| JP | 62-297950 | 12/1987 |
| JP | 4-274533 | 9/1992 |
| JP | HEI 04-281565 | 10/1992 |
| JP | 9-204442 | 8/1997 |
| JP | 9-305622 | 11/1997 |
| JP | 10091638 | 4/1998 |
| JP | HEI 10-124524 | 5/1998 |
| JP | 10-240757 | 9/1998 |
| JP | HEI 11-45243 | 2/1999 |
| JP | H11-232300 A | 8/1999 |
| JP | 11328191 | 11/1999 |
| JP | 2000-194713 | 7/2000 |
| JP | 2001-052017 | 2/2001 |
| JP | 2001-117934 | 4/2001 |
| JP | 2001-265774 | 9/2001 |
| JP | 2002-091843 | 3/2002 |
| JP | 2002-132769 | 5/2002 |
| JP | 2002-140365 | 5/2002 |
| JP | 2002-157271 | 5/2002 |
| JP | 2002-202992 | 7/2002 |
| JP | 2002-245089 | 8/2002 |
| JP | 2002-366549 | 12/2002 |
| JP | 2003-67419 | 3/2003 |
| JP | 2003-076715 | 3/2003 |
| JP | 2003-208434 | 7/2003 |
| JP | 2003-248696 | 9/2003 |
| JP | 2004-21589 | 1/2004 |
| JP | 2004-54588 | 2/2004 |
| JP | 2004-164555 | 6/2004 |
| JP | 2004-192657 | 8/2004 |
| JP | 2004-265015 | 9/2004 |
| JP | 2008-146424 | 12/2006 |
| JP | 2007-507798 | 3/2007 |
| JP | 2008-033931 | 2/2008 |
| JP | 2009-252179 | 4/2008 |
| JP | 2009-509275 | 3/2009 |
| JP | 2009-146248 | 7/2009 |
| JP | 4950444 | 3/2012 |
| KR | 2002-0015838 A | 3/2002 |
| KR | 2003-0081209 A | 10/2003 |
| KR | 20030080826 A | 10/2003 |
| KR | 1020060048716 A | 5/2006 |
| KR | 10-2006-0116042 A | 11/2006 |
| KR | 10-2008-0017685 A | 2/2008 |
| RU | 2138076 C1 | 9/1999 |
| RU | 2001128643 | 7/2003 |
| RU | 2236699 | 9/2004 |
| RU | 2273879 C2 | 4/2006 |
| RU | 2319202 C2 | 3/2008 |
| WO | WO 02/42862 | 5/2002 |
| WO | WO 2006/121269 | 11/2006 |
| WO | WO 2007/089289 | 8/2007 |
| WO | WO 2007/123416 | 11/2007 |
| WO | WO 2009/072174 | 6/2009 |
| ZA | 2011/00293 | 4/2012 |

OTHER PUBLICATIONS

Song, et al., "Exploring URL Hit Priors for Web Search", vol. 3936, Springer Berlin / Heidelberg, 2006.
Eiron, et al., "Analysis of Anchor Text for Web Search", SIGIR 2003, ACM.
Huuhka "Google: Data Structures and Algorithms".
Agichtein, "Improving Web Search Ranking by Incorporating User Behavior Information", SIGIR'06, Aug. 6-11, 2006, ACM, 2006.
Taylor, et al., "Optimisation Methods for Ranking Functions with Multiple Parameters", CIKM'06, Nov. 5-11, 2006, ACM, 2006.
Burges, et al., "Learning to Rank with Nonsmooth Cost Functions".
"International Search Report", Mailed Aug. 28, 2009, Application No. PCT/US2009/036597, Filed Date Mar. 10, 2009, pp. 1-11.
Korean Notice of Preliminary Rejection mailed Jan. 21, 2013 cited in 10-2008-7003121.
Korean Notice of Preliminary Rejection mailed Feb. 4, 2013 cited in 10-2008-7007702.
Chinese Second Office Action mailed Mar. 4, 2013 cited in Appln No. 200980112928.6.
Canadian Office Action mailed Mar. 27, 2013 cited in Appln No. 2,618,854.
Luxenburger et al., "Matching Task Profiles and User Needs in Personalized Web Search", CIKM Proceeding of the 17th ACM Conference on Information and Knowledge Mining, Oct. 2008, pp. 689-698.
Takeda, Takaharu et al., "Multi-Document Summarization by efficient text processing", *Proceedings of the FIT2007, Sixth Forum on Information Technology*, vol. 2, No. E-014, pp. 165-168, Information Processing Society of Japan, Japan, Aug. 22, 2007. (not an English document).
Utiyama, Masao et al., "Implementation of an IR package", *IPSJ SIG Notes*, vol. 2001, No. 74 (2001-FI-63-8), pp. 57-64, Information Processing Society of Japan, Japan, Jul. 25, 2001. (not an English document).
U.S. Appl. No. 12/359,939, Office Action mailed Jun. 17, 2013, 19 pgs.
PCT Search Report in Application PCT/US2013/022825, mailed Apr. 30, 2013, 11 pgs.
Japanese Notice of Rejection in Application 2011-194741, mailed May 14, 2013, 4 pgs.

(56) References Cited

OTHER PUBLICATIONS

Japanese Notice of Rejection in Application 2011-504031, mailed May 14, 2013, 4 pgs.
Mexican Office Action with Summary in PA/a/2008/002173 mailed Jun. 5, 2012.
Chinese First Office Action in 200980112928.6 mailed Jun. 8, 2012.
Malaysian Substantive Examination Report dated Jul. 31, 2012 cited in Appln No. PI 20063920.
Chinese Notice of Reexamination dated Aug. 20, 2012 cited in Appln No. 200680029645.1.
U.S. Appl. No. 12/359,939, Office Action mailed Jul. 17, 2012, 21 pgs.
U.S. Appl. No. 12/569,028, Amendment and Response filed Jun. 27, 2012, 8 pgs.
Chinese Notice of Allowance in Application 200880112416.5, mailed Jul. 18, 2012, 4 pgs.
EP Communication to cancel the oral summons in Application 05105048.2, mailed Jul. 16, 2012, 1 pg.
EP Notice of Allowance in Application 05105048.2, mailed Aug. 13, 2012, 8 pgs.
EP Result of consultation in Application 05105048.2, mailed Aug. 8, 2012, 3 pgs.
Japanese Interrogation in Application 2005-175174, mailed Jul. 24, 2012, 7 pgs.
U.S. Appl. No. 12/359,939, filed Jan. 26, 2009, Amendment and Response filed Nov. 29, 2012, 9 pgs.
Taiwanese Search Report in Application 95129817, mailed Oct. 19, 2012, 1 pg.
Taiwan Office Action dated Oct. 19, 2012 cited in Appln No. PI 6546.
Chinese Decision on Reexamination cited in 200680029645.1, mailed Dec. 14, 2012, 15 pp.
Russian Official Action in 2010141559 mailed Jan. 28, 2013, 4 pp.
U.S. Appl. No. 12/569,028, Office Action mailed Oct. 15, 2012, 14 pgs.
U.S. Appl. No. 12/359,939 filed Jan. 26, 2009, Amendment and Response filed Oct. 26, 2012, 11 pgs.
Chinese Notice of Allowance in Application 200510084707.6, mailed Sep. 25, 2012, 4 pgs.
Malaysia Adverse Search Report in Application PI20080638, mailed Jul. 31, 2012, 4 pgs.
Malaysia Adverse Report in Application PI20063920, mailed Jul. 31, 2012, 3 pgs.
European Extended Search Report in Application 097308084, mailed Oct. 2, 2012, 7 pgs.
U.S. Appl. No. 12/569,028, Amendment and Response filed Jan. 15, 2013, 14 pgs.
European Communication in Application 05105107.6, mailed Dec. 17, 2012, 4 pgs.
Japanese Notice of Allowance in Application 2011-021985, mailed Dec. 25, 2012, 6 pgs.
European Report on Result of Consultation in Application EP 06836141.9, mailed Jan. 9, 2013, 3 pgs.
European Notice of Allowance in Application EP 06836141.9, mailed Jan. 31, 2013, 6 pgs.
Korean Notice of Preliminary Rejection in Application 1020087006775, mailed Feb. 4, 2013, 1 pg.
Malaysian Notice of Allowance in Application PI20063920, mailed Dec. 14, 2012, 2 pgs.
Russian Office Action in Application 2010141559, mailed Jan. 28, 2013, 6 pgs.
Taiwanese Notice of Allowance in Application 95129817, mailed Jan. 29, 2013, 4 pgs.
U.S. Appl. No. 12/569,028, Office Action mailed Apr. 2, 2013, 21 pgs.
U.S. Appl. No. 09/493,748, filed Jan. 28, 2000 entitled "Adaptive Web Crawling Using a Statistical Model".
U.S. Appl. No. 12/828,508, filed Jul. 1, 2010 entitled "System and Method for Ranking Search Results Using Click Distance".
U.S. Appl. No. 13/360,536, filed Jan. 27, 2012 entitled "Re-Ranking Search Results".

"Microsoft FAST Search Server 2010 for SharePoint, Evaluation Guide", Published on Aug. 12, 2010, Available at: http://www.microsoft.com/downloads/info.aspx?na=41&srcfamilyid=f1e3fb39-6959-4185-8b28-5315300b6e6b&srcdisplaylang=en&u=http%3a%2f%2fdownload.microsoft.com%2fdownload%2fA%2f7%2fF%2fA7F98D88-BC15-4F3C-8B71-D42A5ED79964%, 60 pgs.
"Okapi Similarity Measurement (Okapi)", 11th International Web Conference, www2002, 2002, p. 1.
Agarwal et al., "Ranking Database Queries Using User Feedback: A Neural Network Approach", Fall 2006, 9 pp.
Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.
Bohm et al., "Multidimensional Index Structures in Relational Databases", Journal of Intelligent Information Systems, Jul. 2000, vol. 15, Issue 1, pp. 1-20, found at: http://springerlink.com/content/n345270t27538741/fulltext.pdf.
Brin, S. et al., "The Anatomy of a Large-Scale Hypertextual Web Search Engine", Proceedings of the Seventh International World-Wide Web Conference, Online! Apr. 14, 1998, pp. 1-26.
Carmel, D. et al., "Searching XML Documents Via XML Fragments", SIGIR Toronto, Canada, Jul.-Aug. 2003, pp. 151-158.
Chakrabarti, S., "Recent Results in Automatic Web Resource Discovery", ACM Computing Surveys, vol. 31, No. 4es, Dec. 1999, pp. 1-7.
Chen, Hsinchun et al., "A Smart Itsy Bitsy Spider for the Web", Journal of the American Society for Information Science, 49(7), 1998, pp. 604-618.
Chen, Michael et al., Cha Cha, "A System for Organizing Intranet Search Results", Computer Science Department, University of California, Berkeley, 1999, pp. 1-12.
Cho et al., "Efficient Crawling Through URL Ordering", In Proceedings of the 7th International World Wide Web Conference, Apr. 1998, pp. 161-180.
Conlon, M., "Inserts Made Simple", American Printer, Nov. 1, 2002, retrieved from internet on Dec. 17, 2010: http://americanprinter.com/press/other/printing_inserts_made_simple/, 4 pp.
Craswell, N. et al., "TREC12 Web Track as CSIRO", TREC 12, Nov. 2003, 11 pp.
Cutler, M. et al., "A New Study on Using HTML Structures to Improve Retrieval", 11th IEEE International Conference on Chicago, IL, Nov. 9-11, 1999, pp. 406-409.
Desmet, P. et al., "Estimation of Product Category Sales Responsiveness to Allocated Shelf Space", Intern. J. of Research in Marketing, vol. 15, No. 5, Dec. 9, 1998, pp. 443-457.
Ding, Chen et al., "An Improved Usage-Based Ranking", obtained online Jul. 1, 2009 at: http://www.springerlink.com/content/h0jut6d1dnrk5227/fulltext.pdf, 8 pgs.
Fagin, R. et al., "Searching the Workplace Web", IBM Almaden Research Center, In Proceedings of the Twelfth International World Wide Web Conference, Budapest, May 20, 2003, 21 pgs.
Fagin, Ronald, "Searching the Workplace Web", Mar. 3, 2005, pp. 1-10.
Fiedler, J. et al., Using the Web Efficiently: Mobile Crawlers, 17th Annual Int'l. Conference of the Association of Management on Computer Science, Aug. 1999, pp. 324-329.
Gross, Christian, Microsoft Interactive Developer, No. 2, "Integrating the Microsoft Index Server with Active Server pp.", Jun. 1997, 21 pgs.
Hawking, D. et al., "Overview of the TREC-8 Web Track", TREC, Feb. 2000, pp. 1-18.
Hawking, D., "Overview of the TREC-9 Track", TREC, 2000, pp. 1-16.
Hawking., D. et al., "Overview of TREC-7 Very Large Collection Track", TREC, Jan. 1999, pp. 1-13.
Heery, Rachel, "Review of Metadata Formats", Program, vol. 30, No. 4, Oct. 1996, 1996 IEEE, pp. 345-373.
Hiemstra, D. et al., "Relevance Feedback for Best Match Term Weighting Algorithms in Information Retrieval", Proceedings of the

(56) References Cited

OTHER PUBLICATIONS

Joint DELOS-NSF Workshop on Personalisation and Recommender Systems in Digital Libraries, ERCIM Workshop Proceedings 01/W03, pp. 37-42, Jun. 2001.
Horikawa, Akira, "Table design correcting room of Access user", Visual Basic Magazine, vol. 6, No. 3, pp. 158-170, Shoeisha Col. Ltd., Japan, Mar. 1, 2000. (No English translation). As cited in 50037. 0292JP01, 309549.03, JP 2005-175174.
Huang et al., "Design and Implementation of a Chinese Full-Text Retrieval System Based on Probabilistic Model", IEEE, 1993, pp. 1090-1093.
Jones, K. et al., "A probabilistic model of information retrieval: development and status", Department of Information Science, City University, London, Aug. 1998, 76 pgs.
Kazama, K., "A Searching and Ranking Scheme Using Hyperlinks and Anchor Texts", IPSJ SIG Technical Report, vol. 2000, No. 71, Information Processing Society of Japan, Japan, Jul. 28, 2000, pp. 17-24.
Kleinberg, Jon M., "Authoritative Sources in a Hyperlinked Environment", Proceedings of the aCM-SIAM symposium on Discrete Algorithms, 1998, 34 pp.
Kotsakis, E., "Structured Information Retrieval in XML Documents", Proceedings of the ACM Symposium on Applied Computing, Madrid, Spain, 2002, pp. 663-667.
Kucuk, Mehmet Emin, et al., "Application of Metadata Concepts to Discovery of Internet Resources", ADVIS 2000, INCS 1909, pp. 304-313, 2000.
Kwok, K.L., "A Network Approach to Probabilistic Information Retrieval", ACM Transactions on Information Systems, vol. 13, No. 3, Jul. 1995, pp. 324-353.
Lalmas, M., "Uniform Representation of Content and Structure for Structured Document Retrieval", 20th SGES International Conference on Knowledge Based Systems and Applied Artificial Intelligence, Cambridge, UK, Dec. 2000, pp. 1-12.
Lam et al, "Automatic document classification based on probabilistic reasoning: model and performance analysis," Oct. 12-15, 1997, IEEE, Computational Cybernetics and Simulation vol. 3, pp. 2719-2723.
Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.
Lee, J.K.W. et al., "Intelligent Agents for Matching Information Providers and Consumers on the Worl-Wide Web", IEEE, 1997, pp. 189-199.
Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.
Losee, R. et al., "Research in Information Organization", Literature Review, School of Information and Library Science, Section 4, pp. 53-96, Jan. 2001.
Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.
Managing External Content in Microsoft Office SharePoint Portal Server 2003, http://www.microsoft.com/technet/prodtechnol/sppt/reskit/c2261881x.mspx, published on Jun. 9, 2004, printed on May 22, 2006, 20 pp.
Manning, C. et al., "CS276A Text Information Retrieval, Mining, and Exploitation: Lecture 12", Stanford University CS276A/SYMBSYS2391/LING2391 Test Information Retrieval, Mining, and Exploitation, Fall 2002, last modified Nov. 18, 2002, 8 pgs.
Matsuo, Y., "A New Definition of Subjective Distance Between Web Pages," IPSJ Journal, vol. 44, No. 1, Information Processing Society of Japan, Japan, Jan. 15, 2003, pp. 88-94.

Matveeva, Irina et al., "High Accuracy Retrieval with Multiple Nested Ranker," http://people.cs.uchicago.edu/~matveeva/RankerSIGIR06.pdf, *SIGIR'06*, Seattle, WA Aug. 6-11, 2006, 8 pages.
Microsoft Full-Text Search Technologies, http://www.microsoft.com/technet/prodtechnol/sppt/sharepoint/evaluate/featfunc/mssearc . . . , published on Jun. 1, 2001, printed on May 22, 2006, 13 pp.
Microsoft SharePoint Portal Server 2001 Resource Kit: Chapter 24, Analyzing the Default Query for the Dashboard, http://www.microsoft.com/technet/prodtechnol/sppt/sharepoint/reskit/part5/c24spprk.mspx, printed on May 22, 2006, 5 pp.
Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.
Mittal et al., "Framework for Synthesizing Semantic-Level Indices", Multimedia Tools and Applications, Jun. 2003, vol. 20, Iss. 2., pp. 1-24, found online at: http://www.springerlink.com/content/tv632274r1267305/fulltext.pdf.
MSDN, "Understanding Ranking," http://msdn.microsoft.com/en-us/library/ms142524.aspx, Sep. 2007, 4 pages.
Najork, Marc et al., "Breadth-First Crawling Yields High-Quality pp.", ACM, Compaq Systems Research Center, Hong Kong, 2001, pp. 114-118.
Nelson, Chris, "Use of Metadata Registries for Searching for Statistical Data", IEEE 2002, Dimension EDI Ltd., pp. 232-235, 2002.
Nie, Jien Yun, "Introduction to Information Retrieval", University of Montreal Canada, 1989 pp. 1-11.
Numerico, T., "Search engines organization of information and Web Topology", http://www.cafm.lsbu.ac.uk/eminars/sse/numerico-6-dec-2004.pdf, Dec. 6, 2004, 32 pgs.
Ogilvie, P. et al., "Combining Document Representations for Known-Item Search", Proceedings of the 26th Annual International ACM SIGIR Conference on Research and Development in Information Retrieval, Toronto, Canada, 2003, pp. 143-150.
Page, L. et al., "The PageRank Citation Ranking: Bringing Order to the Web", Internet Citation, found online at: http://citeseer.nj.nec.com/page98pagerank.html, retrieved Sep. 16, 2002, 18 pgs.
Planning Your Information Structure Using Microsoft Office SharePoint Portal Server 2003, http://www.microsoft.com/technet/prodtechnol/sppt/reskit/c0861881x.mspx, published on Jun. 9, 2004, printed on May 22, 2006, 22 pp.
Radlinski, Filip, et al. "Query Chains: Learning to Rank from Implicit Feedback, "http://delivery.acm.org/10.1145/1090000/1081899/p239-radlinski. pdf?key1=1081899&key2=3628533811&coll=GUIDE& CFID=27212902&CFTOKEN=53118399, *KDD'05*, Chicago, IL, Aug. 21-24, 2005,10 pages.
Robertson, S. et al., "Okapi at TREC-3", Centre for Interactive Systems Research Department of Information Science, Third Text Retrieval Conference, 1995, 19 pp.
Robertson, S. et al., "Okapi at TREC-4", 1996, 24 pp.
Robertson, S. et al., "Some Simple Effective Approximations to the 2-Poisson Model for Probabilistic Weighted Retrieval", Proceedings of the 17th Annual International ACM SIGIR Conference on Research and Development in Information Retrieval, 1994, pp. 232-241.
Schulz, Stefan, et al., "Indexing Medical WWW Documents by Morphemes", MEDINFO 2001 Proceedings of the 10th World Congress on Medical Informatics, Park I, IOS Press, Inc., pp. 266-270, 2001.
Senecal, Sylvain, "Consumers' Decision-Making Process and Their Online Shopping Behavior: A Clickstream Analysis", Jun. 1, 2004, pp. 1600-1607.
Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.
SharePoint Portal Server 2001 Planning and Installation Guide, http://www.microsoft.com/technet/prodtechnol/sppt/sharepoint/plan/planinst.mspx, printed on May 22, 2006, 86 pp.
Singhal, A. et al., "AT&T at TREC-9", Proceedings of the Ninth Text Retrieval Conference, NIST Special Publication 500-249, 'Online! 2001, pp. 103-105.

(56) References Cited

OTHER PUBLICATIONS

Singhal, A. et al., "Document Length Normalization", Cornell University, vol. 32, No. 5, 1996, pp. 619-633.
Smyth, Barry, "Relevance at a Distance—An Investigation of Distance-Biased Personalization on the Mobile Internet", no date, pp. 1-6.
Sturdy, Derek, "Squirrels and nuts: metadata and knowledge management", Business Information Review, 18(4), pp. 34-42, Dec. 2001.
Voorhees, E., "Overview of TREC 2002", Gaithersburg, Maryland, Nov. 19-22, 15 pp.
Web Page "Reuters: Reuters Corpus", http://about.reuter.com/researchandstandards/corpus/, viewed Mar. 18, 2004.
Wen, Ji-Rong, "Query Clustering Using User Logs", Jan. 2002, pp. 59-81.
Westerveld, T. et al., "Retrieving Web pages using Content, Links, URLs and Anchors", Proceedings of the Tenth Text Retrieval Conference, NIST Special Publication, 'Online! Oct. 2001, pp. 1-10.
Wilkinson, R., "Effective Retrieval of Structured Documents", Annual ACM Conference on Research and Development, 1994, 7 pp.
Xue, Gui-Rong et al., "Optimizing Web Search Using Web Click-Through Data," http://people.cs.vt.edu/~xwensi/Publication/p118-xue.pdf, CIKM'04, Nov. 8-13, 2004, 9 pages.
Yi, Jeonghe,e et al., "Metadata Based Web Mining for Topic-Specific Information Gathering", IEEE, pp. 359-368, 2000.
Yi, Jeonghee, et al., "Using Metadata to Enhance Web Information Gathering", D.Suciu and G. Vossen (eds.): WebDB 2000, LNCS 1997, pp. 38-57, 2001.
Yuwono, Budi and Lee, Dik L., "Search and Ranking Algorithms for Locating Resources on the World Wide Web", IEEE, 1996, pp. 164-170.
Zamir, O. et al., "Grouper: A Dynamic Clustering Interface to Web Search Results", Computer Networks (Amsterdam, Netherlands: 1999), 31(11-16): 1361-1374, 1999.
U.S. Official Action in U.S. Appl. No. 10/609,315 mailed Dec. 15, 2005, 13 pgs.
U.S. Official Action in U.S. Appl. No. 10/981,962 mailed Apr. 5, 2006, 15 pgs.
U.S. Official Action in U.S. Appl. No. 10/609,315 mailed Jun. 1, 2006, 12 pgs.
U.S. Official Action in U.S. Appl. No. 10/981,962 mailed Sep. 21, 2006, 16 pgs.
U.S. Official Action in U.S. Appl. No. 10/804,326 mailed Oct. 16, 2006, 18 pgs.
U.S. Official Action in U.S. Appl. No. 10/955,462 mailed Nov. 3, 2006, 19 pgs.
U.S. Official Action in U.S. Appl. No. 10/955,983 mailed Mar. 22, 2007, 25 pgs.
U.S. Official Action in U.S. Appl. No. 10/981,962 mailed Apr. 30, 2007, 21 pgs.
U.S. Official Action in U.S. Appl. No. 10/955,462 mailed May 11, 2007, 26 pgs.
U.S. Official Action in U.S. Appl. No. 10/804,326 mailed Jun. 7, 2007, 19 pgs.
U.S. Official Action in U.S. Appl. No. 11/019,091 mailed Jun. 20, 2007.
U.S. Official Action in U.S. Appl. No. 10/955,462 mailed Sep. 10, 2007, 22 pgs.
U.S. Official Action in U.S. Appl. No. 11/073,381 mailed Sep. 18, 2007, 17 pgs.
U.S. Official Action in U.S. Appl. No. 10/955,983 mailed Nov. 13, 2007, 27 pgs.
U.S. Official Action in U.S. Appl. No. 11/238,906 mailed Jan. 8, 2008, 18 pgs.
U.S. Official Action in U.S. Appl. No. 10/981,962 mailed Mar. 17, 2008, 20 pgs.
U.S. Official Action in U.S. Appl. No. 11/019,091 mailed Apr. 3, 2008.
U.S. Official Action in U.S. Appl. No. 11/412,723 mailed May 28, 2008, 22 pgs.
U.S. Official Action in U.S. Appl. No. 11/073,381 mailed Jul. 10, 2008, 19 pgs.
U.S. Official Action in U.S. Appl. No. 11/206,286 mailed Jul. 14, 2008, 15 pgs.
U.S. Official Action in U.S. Appl. No. 10/955,983 mailed Jul. 21, 2008, 28 pgs.
U.S. Official Action in U.S. Appl. No. 11/238,906 mailed Sep. 16, 2008, 17 pgs.
U.S. Official Action in U.S. Appl. No. 10/804,326 mailed Dec. 10, 2008, 7 pgs.
U.S. Official Action in U.S. Appl. No. 11/019,091 mailed Dec. 11, 2008, 24 pgs.
U.S. Official Action in U.S. Appl. No. 10/955,983 mailed Dec. 18, 2008, 29 pgs.
U.S. Official Action in U.S. Appl. No. 11/206,286 mailed Dec. 24, 2008, 16 pgs.
U.S. Official Action in U.S. Appl. No. 11/412,723 mailed Mar. 6, 2009, 22 pgs.
U.S. Official Action in U.S. Appl. No. 11/073,381 mailed Apr. 15, 2009, 20 pgs.
U.S. Official Action in U.S. Appl. No. 11/238,906 mailed May 19, 2009, 20 pgs.
U.S. Official Action in U.S. Appl. No. 10/955,983 mailed Jun. 10, 2009, 30 pgs.
U.S. Official Action in U.S. Appl. No. 11/019,091 mailed Sep. 1, 2009, 26 pgs.
U.S. Official Action in U.S. Appl. No. 11/412,723 mailed Sep. 3, 2009, 20 pgs.
U.S. Official Action in U.S. Appl. No. 11/073,381 mailed Sep. 29, 2009, 21 pgs.
U.S. Official Action in U.S. Appl. No. 11/874,844 mailed Nov. 13, 2009, 14 pgs.
U.S. Official Action in U.S. Appl. No. 11/238,906 mailed Dec. 18, 2009, 21 pgs.
U.S. Official Action in U.S. Appl. No. 11/412,723 mailed Mar. 11, 2010, 20 pgs.
U.S. Official Action in U.S. Appl. No. 11/073,381 mailed Apr. 12, 2010, 25 pgs.
U.S. Official Action in U.S. Appl. No. 11/874,579 mailed Jun. 22, 2010, 23 pgs.
U.S. Official Action in U.S. Appl. No. 12/828,508 mailed Aug. 13, 2010, 16 pgs.
U.S. Official Action in U.S. Appl. No. 11/073,381 mailed Sep. 13, 2010, 24 pgs.
U.S. Official Action in U.S. Appl. No. 11/874,579 mailed Jan. 14, 2011, 23 pgs.
U.S. Official Action in U.S. Appl. No. 11/073,381 mailed Feb. 23, 2011, 27 pgs.
U.S. Official Action in U.S. Appl. No. 12/207,910 mailed Jun. 7, 2011, 30 pgs.
U.S. Appl. No. 11/874,579, filed Oct. 18, 2007, Amendment and Response filed Nov. 22, 2010, 8 pgs.
U.S. Appl. No. 11/874,579 filed Oct. 18, 2007, Amendment and Response filed May 16, 2011, 14 pgs.
U.S. Appl. No. 12/828,508, Amendment and Response filed Jan. 13, 2011, 11 pgs.
U.S. Appl. No. 12/828,508, Notice of Allowance mailed Mar. 31, 2011, 9 pgs.
U.S. Appl. No. 12/828,508, Notice of Allowance mailed Jul. 6, 2011, 8 pgs.
U.S. Appl. No. 11/019,091, Amendment and Response filed Dec. 20, 2007, 23 pgs.
U.S. Appl. No. 11/019,091, Amendment and Response filed Oct. 3, 2008, 15 pgs.
U.S. Appl. No. 11/019,091, Amendment and Response filed Jun. 11, 2009, 12 pgs.
U.S. Appl. No. 11/019,091, Amendment and Response filed Nov. 30, 2009, 11 pgs.
U.S. Appl. No. 11/019,091, Notice of Allowance mailed Dec. 23, 2009, 16 pgs.
U.S. Appl. No. 11/073,381, Amendment and Response filed Mar. 18, 2008, 14 pgs.

(56) References Cited

OTHER PUBLICATIONS

U.S. Appl. No. 11/073,381, Amendment and Response filed Dec. 9, 2008, 11 pgs.
U.S. Appl. No. 11/073,381, Amendment and Response filed Jul. 15, 2009, 10 pgs.
U.S. Appl. No. 11/073,381, Amendment and Response filed Dec. 28, 2009, 9 pgs.
U.S. Appl. No. 11/073,381, Amendment and Response filed Jul. 9, 2010, 10 pgs.
U.S. Appl. No. 11/073,381, Amendment and Response filed Dec. 13, 2010, 10 pgs.
U.S. Appl. No. 10/804,326, Amendment and Response filed Mar. 16, 2007, 21 pgs.
U.S. Appl. No. 10/804,326, Amendment and Response filed Sep. 7, 2007, 26 pgs.
U.S. Appl. No. 10/804,326, Final Office Action mailed Dec. 11, 2007, 24 pgs.
U.S. Appl. No. 10/804,326, Amendment and Response filed Feb. 11, 2008, 28 pgs.
U.S. Appl. No. 10/804,326, Advisory Action mailed Feb. 21, 2008, 3 pgs.
U.S. Appl. No. 10/804,326, Amendment and Response filed Jun. 10, 2008, 27 pgs.
U.S. Appl. No. 10/804,326, Amendment and Response filed Mar. 9, 2009, 8 pgs.
U.S. Appl. No. 10/804,326, Notice of Allowance mailed May 29, 2009, 8 pgs.
U.S. Appl. No. 10/609,315, Amendment and Response filed Mar. 17, 2006, 14 pgs.
U.S. Appl. No. 10/609,315, Amendment and Response filed Nov. 29, 2006, 23 pgs.
U.S. Appl. No. 10/609,315, Notice of Allowance mailed Jan. 24, 2007, 6 pgs.
U.S. Appl. No. 10/609,315, Notice of Allowance mailed May 30, 2007, 4 pgs.
U.S. Appl. No. 11/238,906, Amendment and Response filed Jun. 9, 2008, 10 pgs.
U.S. Appl. No. 11/238,906, Amendment and Response filed Feb. 26, 2009, 9 pgs.
U.S. Appl. No. 11/238,906, Amendment and Response filed Sep. 1, 2009, 9 pgs.
U.S. Appl. No. 11/238,906, Amendment and Response filed May 28, 2010, 9 pgs.
U.S. Appl. No. 11/238,906, Notice of Allowance mailed Jul. 22, 2010, 10 pgs.
U.S. Appl. No. 11/238,906, Notice of Allowance mailed Aug. 5, 2010, 4 pgs.
U.S. Appl. No. 11/412,723, Amendment and Response filed Nov. 26, 2008, 10 pgs.
U.S. Appl. No. 11/412,723, Amendment and Response filed Jun. 23, 2009, 11 pgs.
U.S. Appl. No. 11/412,723, Amendment and Response filed Nov. 30, 2009, 10 pgs.
U.S. Appl. No. 11/412,723, Amendment and Response filed May 31, 2010, 11 pgs.
U.S. Appl. No. 11/412,723, Notice of Allowance mailed Jul. 9, 2010, 10 pgs.
U.S. Appl. No. 11/874,844, Amendment and Response filed Mar. 15, 2010, 16 pgs.
U.S. Appl. No. 11/874,844, Notice of Allowance mailed May 18, 2010, 9 pgs.
U.S. Appl. No. 11/874,844, Notice of Allowance mailed Jun. 25, 2010, 2 pgs.
U.S. Appl. No. 09/493,748, Office Action mailed Sep. 25, 2003, 11 pgs.
U.S. Appl. No. 09/493,748, Amendment and Response filed Apr. 20, 2004, 16 pgs.
U.S. Appl. No. 09/493,748, Final Office Action mailed Jul. 20, 2004, 14 pgs.
U.S. Appl. No. 09/493,748, Amendment and Response filed Oct. 12, 2004, 18 pgs.
U.S. Appl. No. 09/493,748, Advisory Action mailed Jan. 4, 2005, 2 pgs.
U.S. Appl. No. 09/603,695, Office Action mailed Nov. 7, 2003, 11 pgs.
U.S. Appl. No. 09/603,695, Amendment and Response filed Feb. 27, 2004, 13 pgs.
U.S. Appl. No. 09/603,695, Final Office Action mailed May 18, 2004, 12 pgs.
U.S. Appl. No. 09/603,695, Amendment and Response filed Jul. 22, 2004, 13 pgs.
U.S. Appl. No. 09/603,695, Advisory Action mailed Aug. 27, 2004, 3 pgs.
U.S. Appl. No. 09/603,695, Amendment and Response filed Nov. 5, 2004, 9 pgs.
U.S. Appl. No. 09/603,695, Notice of Allowance mailed Dec. 21, 2004, 8 pgs.
U.S. Appl. No. 10/981,962, Advisory Action mailed Jan. 23, 2007, 3 pgs.
U.S. Appl. No. 10/981,962, Amendment and Response filed Feb. 7, 2007, 1 pg.
U.S. Appl. No. 10/981,962, Amendment and Response filed Jul. 27, 2007, 16 pgs.
U.S. Appl. No. 10/981,962, Office Action mailed Nov. 13, 2007, 3 pgs.
U.S. Appl. No. 10/981,962, Amendment and Response filed Nov. 27, 2007, 10 pgs.
U.S. Appl. No. 10/981,962, Amendment and Response filed Aug. 18, 2008, 10 pgs.
U.S. Appl. No. 10/981,962, Notice of Allowance mailed Sep. 11, 2008, 14 pgs.
U.S. Appl. No. 10/981,962, Notice of Allowance mailed Oct. 15, 2008, 6 pgs.
U.S. Appl. No. 10/981,962, Notice of Allowance mailed Jan. 9, 2009, 6 pgs.
U.S. Appl. No. 10/981,962, Notice of Allowance mailed Jan. 29, 2009, 6 pgs.
U.S. Appl. No. 10/981,962, Notice of Allowance mailed May 8, 2009, 6 pgs.
U.S. Appl. No. 10/981,962, Notice of Allowance mailed Aug. 20, 2009, 6 pgs.
U.S. Appl. No. 11/022,054, Office Action mailed Jun. 19, 2007, 19 pgs.
U.S. Appl. No. 11/022,054, Amendment and Response filed Aug. 24, 2007, 19 pgs.
U.S. Appl. No. 11/022,054, Notice of Allowance mailed Nov. 15, 2007, 10 pgs.
U.S. Appl. No. 11/206,286, Amendment and Response filed Sep. 30, 2008, 11 pgs.
U.S. Appl. No. 11/206,286, Amendment and Response filed Mar. 24, 2009, 13 pgs.
U.S. Appl. No. 11/206,286, Notice of Allowance mailed Apr. 22, 2009, 9 pgs.
U.S. Appl. No. 11/206,286, Amendment and Response filed Jul. 22, 2009, 3 pgs.
U.S. Appl. No. 10/955,462 Amendment and Response filed Mar. 5, 2007, 18 pgs.
U.S. Appl. No. 10/955,462 Amendment and Response filed Aug. 8, 2007, 21 pgs.
U.S. Appl. No. 10/955,462 Amendment and Response filed Mar. 10, 2008, 17 pgs.
U.S. Appl. No. 10/955,462 Notice of Allowance mailed Jun. 17, 2008, 12 pgs.
U.S. Appl. No. 10/955,462 Notice of Allowance mailed Sep. 23, 2008, 6 pgs.
U.S. Appl. No. 10/955,462 Notice of Allowance mailed Feb. 24, 2009, 7 pgs.
U.S. Appl. No. 10/955,462 Notice of Allowance mailed Jun. 10, 2009, 6 pgs.
U.S. Appl. No. 10/955,462 Notice of Allowance mailed Oct. 16, 2009, 7 pgs.

(56) References Cited

OTHER PUBLICATIONS

U.S. Appl. No. 10/955,462 Notice of Allowance mailed Jan. 25, 2010, 6 pgs.
U.S. Appl. No. 10/955,983, Amendment and Response filed Aug. 22, 2007, 13 pgs.
U.S. Appl. No. 10/955,983, Amendment and Response filed May 13, 2008, 14 pgs.
U.S. Appl. No. 10/955,983, Amendment and Response filed Sep. 25, 2008, 13 pgs.
U.S. Appl. No. 10/955,983, Amendment and Response filed Mar. 18, 2009, 18 pgs.
U.S. Appl. No. 10/955,983, Amendment and Response filed Oct. 13, 2009, 12 pgs.
U.S. Appl. No. 10/955,983, Notice of Allowance mailed Jan. 12, 2010, 10 pgs.
U.S. Appl. No. 10/955,983, Notice of Allowance mailed Jun. 4, 2010, 5 pgs.
U.S. Appl. No. 10/951,123, Office Action mailed Jan. 25, 2007, 16 pgs.
U.S. Appl. No. 10/951,123, Amendment and Response filed Apr. 25, 2007, 15 pgs.
U.S. Appl. No. 10/951,123, Final Office Action mailed Jul. 13, 2007, 15 pgs.
U.S. Appl. No. 10/951,123, Amendment and Response filed Dec. 13, 2007, 10 pgs.
U.S. Appl. No. 10/951,123, Advisory Action mailed Dec. 31, 2007, 3 pgs.
U.S. Appl. No. 10/951,123, Amendment and Response filed Jan. 14, 2008, 10 pgs.
U.S. Appl. No. 10/951,123, Office Action mailed Mar. 18, 2008, 20 pgs.
U.S. Appl. No. 10/951,123, Amendment and Response filed Sep. 17, 2008, 15 pgs.
U.S. Appl. No. 10/951,123, Final Office Action mailed Jan. 5, 2009, 23 pgs.
U.S. Appl. No. 10/951,123, Amendment and Response filed Apr. 6, 2009, 18 pgs.
U.S. Appl. No. 10/951,123, Notice of Allowance mailed Jun. 25, 2009, 5 pgs.
U.S. Appl. No. 10/956,891, Office Action mailed Mar. 22, 2007, 15 pgs.
U.S. Appl. No. 10/956,891, Amendment and Response filed Aug. 22, 2007, 11 pgs.
U.S. Appl. No. 10/956,891, Final Office Action filed Nov. 1, 2007, 18 pgs.
U.S. Appl. No. 10/956,891, Amendment and Response filed Mar. 3, 2008, 11 pgs.
U.S. Appl. No. 10/956,891, Advisory Action mailed Mar. 21, 2008, 3 pgs.
U.S. Appl. No. 10/956,891, Amendment and Response filed May 1, 2008, 11 pgs.
U.S. Appl. No. 10/956,891, Office Action mailed Jul. 16, 2008, 19 pgs.
U.S. Appl. No. 10/956,891, Amendment and Response filed Oct. 16, 2008, 12 pgs.
U.S. Appl. No. 10/956,891, Final Office Action mailed Dec. 31, 2008, 16 pgs.
U.S. Appl. No. 10/956,891, Amendment and Response filed Jun. 1, 2009, 12 pgs.
U.S. Appl. No. 10/956,891, Notice of Allowance mailed Aug. 20, 2009, 7 pgs.
U.S. Appl. No. 11/231,955, filed Sep. 21, 2005, Office Action mailed Jan. 30, 2008, 8 pgs.
U.S. Appl. No. 11/231,955, filed Sep. 21, 2005, Amendment and Response filed Apr. 30, 2008, 12 pgs.
U.S. Appl. No. 11/231,955, filed Sep. 21, 2005, Final Office Action mailed Jun. 4, 2008, 8 pgs.
U.S. Appl. No. 11/231,955, filed Sep. 21, 2005, Amendment and Response filed Sep. 15, 2008, 16 pgs.
U.S. Appl. No. 11/231,955, filed Sep. 21, 2005, Notice of Allowance mailed Oct. 21, 2008, 5 pgs.
U.S. Appl. No. 12/359,939, filed Jan. 26, 2009, Office Action mailed Jan. 21, 2011, 15 pgs.
U.S. Appl. No. 12/359,939, filed Jan. 26, 2009, Amendment and Response filed May 23, 2011, 8 pgs.
U.S. Appl. No. 12/207,910, Amendment and Response filed Sep. 7, 2011, 14 pgs.
U.S. Appl. No. 12/828,508, Amendment and Response filed Sep. 6, 2011, 3 pgs.
U.S. Appl. No. 12/569,028, Office Action mailed Sep. 28, 2011, 14 pgs.
U.S. Appl. No. 12/359,939, filed Jan. 26, 2009, Amendment and Response filed Jul. 21, 2011, 8 pgs.
U.S. Appl. No. 12/359,939, filed Jan. 26, 2009, Amendment and Response filed Sep. 28, 2011, 14 pgs.
U.S. Appl. No. 12/359,939, filed Jan. 26, 2009, Office Action mailed Dec. 6, 2011, 14 pgs.
U.S. Appl. No. 10/981,962, Amendment and Response filed Jun. 27, 2006, 23 pgs.
U.S. Appl. No. 12/207,910, Office Action mailed Dec. 12, 2011, 27 pgs.
U.S. Appl. No. 12/207,910, Amendment and Response filed Mar. 12, 2012, 13 pgs.
U.S. Appl. No. 12/569,028, Office Action mailed Feb. 27, 2012, 11 pgs.
U.S. Appl. No. 12/569,028, Amendment and Response filed Dec. 28, 2011, 8 pgs.
U.S. Appl. No. 12/359,939, Amendment and Response filed Mar. 23, 2012, 11 pgs.
U.S. Appl. No. 09/749,005, Office Action mailed Oct. 28, 2002, 12 pgs.
U.S. Appl. No. 09/749,005, Amendment and Response filed Apr. 28, 2003, 12 pgs.
U.S. Appl. No. 09/749,005, Office Action mailed Jun. 12, 2003, 10 pgs.
U.S. Appl. No. 09/749,005, Amendment and Response filed Jun. 21, 2004, 14 pgs.
U.S. Appl. No. 09/749,005, Notice of Allowance mailed Aug. 30, 2004, 9 pgs.
U.S. Appl. No. 09/749,005, Notice of Allowance mailed Mar. 4, 2005, 4 pgs.
U.S. Appl. No. 09/749,005, Notice of Allowance mailed Apr. 7, 2005, 4 pgs.
U.S. Appl. No. 10/959,330, Office Action mailed Jun. 27, 2005, 10 pgs.
U.S. Appl. No. 10/959,330, Amendment and Response filed Sep. 14, 2005, 12 pgs.
U.S. Appl. No. 10/959,330, Office Action mailed Dec. 14, 2005, 6 pgs.
U.S. Appl. No. 10/959,330, Amendment and Response filed Jan. 6, 2006, 10 pgs.
U.S. Appl. No. 10/959,330, Notice of Allowance mailed Apr. 3, 2006, 6 pgs.
U.S. Appl. No. 10/968,716, Office Action mailed Mar. 15, 2007, 13 pgs.
U.S. Appl. No. 10/968,716, Amendment and Response filed Jun. 15, 2007, 13 pgs.
U.S. Appl. No. 10/968,716, Amendment and Response filed Aug. 13, 2007, 6 pgs.
U.S. Appl. No. 10/968,716, Office Action mailed Oct. 26, 2007, 14 pgs.
U.S. Appl. No. 10/968,716, Amendment and Response filed Jan. 25, 2008, 8 pgs.
U.S. Appl. No. 10/968,716, Notice of Allowance mailed Jun. 2, 2008, 8 pgs.
Australian Exam Report in Application No. 2008 00521-7, mailed Mar. 11, 2009, 4 pgs.
Australian First Examiners Report in 2006279520 mailed Oct. 5, 2010.
Australian Notice of Allowance in Application 2006279520, mailed Mar. 2, 2011, 3 pgs.

(56) References Cited

OTHER PUBLICATIONS

Chinese Application 200510088213.5, Notice of Allowance mailed Apr. 20, 2010, , 4 pgs.
Chinese Application No. 200510088212.0, First Office Action mailed Jul. 4, 2008, 10 pgs.
Chinese Application No. 200510088212.0, Notice of Allowance mailed Jan. 8, 2010, 4 pgs.
Chinese Decision on Re-Examination in Application 200510084707.6 mailed Aug. 22, 2011, 12 pgs.
Chinese Decision on Rejection in 200680029645.1 mailed Aug. 12, 2010.
Chinese Final Rejection in 200510084707.6 mailed Aug. 21, 2009, 13 pgs.
Chinese Final Rejection in 200510088213.5 mailed Mar. 6, 2009.
Chinese First Office Action in 200510084707.6 mailed Mar. 28, 2008, 10 pgs.
Chinese First Office Action in 200680034531.6 mailed Sep. 11, 2009, 7 pgs.
Chinese First Office Action in Chinese Application/Patent No. 200880112416.5, mailed Aug. 12, 2011, 11 pgs.
Chinese First Official Action in 200510088213.5 mailed May 9, 2008.
Chinese First Official Action in 200510088527.5 mailed Apr. 18, 2008.
Chinese First Official Action in 200680029645.1 mailed Jun. 19, 2009.
Chinese First Official Action in 200680035828.4 mailed Jun. 19, 2009.
Chinese Notice of Allowance in 200510088527.5 mailed Jul. 24, 2009, 4 pgs.
Chinese Notice of Allowance in 200680034531.6 mailed Oct. 14, 2010, 6 pgs.
Chinese Second Office Action in 200510084707.6 mailed Nov. 7, 2008, 10 pgs.
Chinese Second Office Action in 200680029645.1 mailed Apr. 6, 2010.
Chinese Second Official Action in 200510088213.5 mailed Oct. 10, 2008.
Chinese Second Official Action in 200510088527.5 mailed Dec. 26, 2008.
Chinese Third Office Action in 200510084707.6 mailed Feb. 20, 2009, 12 pgs.
Chinese Third Official Action in 200510088213.5 mailed Sep. 4, 2009.
Egyptian Official Action in PCT 269/2008 mailed Feb. 1, 2010.
EP 2nd Office Action in Application 05105672.9, mailed Oct. 15, 2009, 4 pgs.
EP Exam Report in EP 00309121.2-1522 mailed Jul. 4, 2003.
EP Exam Report in EP 00309121.2-1527 mailed Feb. 8, 2007.
EP Exam Report in EP 00309121.2-1527 mailed Jun. 16, 2004.
EP Exam Report in EP 05105048.2-2201 mailed Apr. 23, 2007.
EP Examination Report in Application 05105672.9, mailed Oct. 24, 2006, 4 pgs.
EP Office Action in Application 05105107.6, mailed Mar. 28, 2008, 6 pgs.
EP Search Report in Application 05105107.6, mailed Apr. 7, 2006, 3 pgs.
EP Search Report in Application 05105672.9, mailed Feb. 6, 2006, 3 pgs.
EP Search Report in EP 00309121 mailed Jul. 18, 2002.
EP Search Report in EP 05105048 mailed Jan. 17, 2006.
EP Search Report in EP 05105110 dated Aug. 11, 2006.
EP Summons to Attend Oral Proceedings in EP 05105048.2-2201 mailed Apr. 3, 2012.
European Extended Search Report in Application 06836141.9 mailed Dec. 27, 2011, 8 pgs.
European Notice of Allowance in Application 00309121.2, mailed Jun. 15, 2009, 5 pgs.
European Official Action in 05105110.0/1527 mailed Aug. 4, 2010.
European Search Report in 08840594.9-2201 mailed Feb. 23, 2011.
European Search Report in 08840594.9-2201 mailed Jan. 21, 2011.
European Search Report in Application 06789800.7 mailed Oct. 13, 2011, 11 pgs.
Extended European Search Report in Application 06804098.9, mailed Dec. 19, 2011, 7 pgs.
Indonesian Notice of Allowance in Application W00200800848 mailed Jun. 9, 2011, 4 pgs.
Japanese Appeal Decision in 2008-527094 (Appeal No. 2010-011037) mailed Nov. 4, 2011—31 pgs., only first page translated.
Japanese Final Notice of Rejection in Application No. 2005-187816 mailed Mar. 16, 2012, 5 pgs.
Japanese Final Rejection in 2005-175172 mailed Jun. 7, 2011, 5 pgs.
Japanese Final Rejection in 2008-527094 mailed Jan. 22, 2010.
Japanese Final Rejection in JP Application 2008-532469, mailed Jan. 29, 2010, 19 pgs.
Japanese Notice of Allowance in 2005-175172 mailed Mar. 6, 2012, 6 pgs.
Japanese Notice of Allowance in 2005-175173 mailed Jun. 7, 2011, 6 pgs.
Japanese Notice of Allowance in JP Application 2008-532469, mailed Feb. 22, 2011, 6 pgs.
Japanese Notice of Final Rejection in 2005-175174, mailed Aug. 5, 2011, 5 pgs.
Japanese Notice of Rejection in 2005-175172 mailed Sep. 28, 2010.
Japanese Notice of Rejection in 2005-175173 mailed Oct. 1, 2010.
Japanese Notice of Rejection in 2005-175174 , mailed Oct. 29, 2010, 13 pgs.
Japanese Notice of Rejection in 2008-527094 mailed Sep. 11, 2009.
Japanese Notice of Rejection in Application No. 2005-187816 mailed May 20, 2011, 13 pgs.
Japanese Office Action in JP Application 2008-532469, mailed Sep. 29, 2009, 18 pgs.
Korean Official Action in 2005-0057199 mailed Aug. 4, 2011, pgs.
Korean Official Action in 2005-0057199 mailed Mar. 26, 2012, 5 pgs.
New Zealand Examination Report in Application No. 566532, mailed Oct. 15, 2009, 2 pgs.
PCT International Search Report, Application No. PCT/US2006/037206, mailed Jan. 16, 2007, 10 pgs.
PCT Search Report in PCT/US2006/031965 mailed Jan. 11, 2007.
PCT Search Report in PCT/US2008/011894 mailed Feb. 27, 2009, 12 pgs.
PCT Search Report in PCT/US2009/063333 dated Apr. 22, 2010, 10 pgs.
Philippines Office Action in 1-2008-500189 mailed Mar. 11, 2011, 1 page.
Philippines Official Action in 1-2008-500189 mailed Jun. 22, 2011, 1 page.
Philippines Official Action in 1-2008-500433 mailed Mar. 24, 2011, 1 page.
Philippines Letters Patent in Application 12008500189, issued Jan. 6, 2012, 2 pgs.
Russian Application No. 2008105758, Notice of Allowance mailed Dec. 16, 2010, 5 pgs.
Russian Notice of Allowance in Application No. 2008110731/08, mailed Oct. 25, 2010, 7 pgs.
Russian Official Action in 2008105758 mailed Jun. 29, 2010.
South Africa Notice of Allowance in Application No. 2008/02250 mailed Jul. 23, 2009, 1 page.
Japanese Appeal Decision and Notice of Allowance in Application 2005-175174, mailed Jun. 18, 2013, 4 pgs.
Malaysian Notice of Allowance in Application PI 20080638, mailed Jun. 28, 2013, 2 pgs.
Russian Notice of Allowance in Application No. 2010141559, mailed Jun. 27, 2013, 6 pgs.
U.S. Appl. No. 12/569,028, Amendment and Response filed Aug. 2, 2013, 17 pgs.
U.S. Appl. No. 12/569,028, Office Action mailed Aug. 28, 2013, 21 pgs.
U.S. Appl. No. 11/874,579, Office Action mailed Sep. 10, 2013, 27 pgs.
U.S. Appl. No. 12/359,939, Office Action mailed Oct. 11, 2013, 11 pgs.

(56) References Cited

OTHER PUBLICATIONS

Murata, Shin Ya, et al., "Ranking Search Results based on Information Needs in Conjunction with Click-Log Analysis", Journal of Japan Database Society, Japan Database Society, Mar. 27, 2009, vol. 7, Part 4, pp. 37-42.
Japanese Notice of Rejection in Application 2011-527079, mailed Oct. 8, 2013, 15 pgs.
Japanese Notice of Allowance in Application 2011-194741, mailed Sep. 6, 2013, 4 pgs.
Japanese Notice of Rejection in Application 2011-266249, mailed Sep. 2, 2013, 7 pgs.
U.S. Appl. No. 12/791,756, Notice of Allowance mailed Feb. 7, 2014, 10 pgs.
U.S. Appl. No. 12/569,028, Amendment and Response filed Jan. 28, 2014, 13 pgs.
U.S. Appl. No. 12/359,939, Amendment and Response filed Mar. 11, 2014, 10 pgs.
Australian Office Action in Application 2009234120, mailed Feb. 26, 2014, 3 pgs.
Japanese Notice of Allowance in Application 2011-504031, mailed Jan. 30, 2014, 4 pgs.
Becker, Hila et al., "Learning Similarity Metrics for Event Identification in Social Media," Published Date: Feb. 4-6, 2010, http://infolab.stanford.edu/~mor/research/becker-wsdm10.pdf, 10 pgs.
Hoeber, Orland et al., "Evaluating the Effectiveness of Term Frequency Histograms for Supporting Interactive Web Search Tasks," Published Date: Feb. 25-27, 2008, http://delivery.acm.org/10.1145/1400000/1394484/p360-hoeber.pdf?key1=1394484&key2=1611170721&coll=GUIDE&dl=GUIDE&CFID=83362159&CFTOKEN=63982632, 9 pgs.
PCT International Search Report and Written Opinion in Application PCT/US2011/033125, mailed Dec. 15, 2011, 8 pgs.
Pera, Maria S. et al., "Using Word Similarity to Eradicate Junk Emails," Published Date: Nov. 6-8, 2007, http://delivery.acm.org/10.1445/1330000/1321581/p943-pera.pdf?key1=1321581&key2=842117072&coll=GUIDE&dl=GUIDE&CFID=83362328&CFTOKEN=17563913, 4 pgs.
Svore, Krysta M. et al., "Improving Web Spam Classifaction using Rank-time Features," Published Date: May 8, 2007, http://www2007.org/workshops/paper_101.pdf, 8 pgs.
U.S. Appl. No. 12/791,756, Amendment and Response filed Apr. 30, 2012, 12 pgs.
U.S. Appl. No. 12/791,756, Amendment and Response filed Sep. 26, 2012, 14 pgs.
U.S. Appl. No. 12/791,756, Office Action mailed Jan. 31, 2012, 18 pgs.
U.S. Appl. No. 12/791,756, Office Action mailed Oct. 3, 2013, 32 pgs.
U.S. Appl. No. 12/791,756, Office Action mailed Jun. 26, 2012, 26 pgs.
Russian Notice of Allowance in Application 2011108842, mailed Dec. 16, 2013, 7 pgs. (English translation).
U.S. Appl. No. 12/791,756, Amendment and Response filed Dec. 24, 2103, 19 pgs.
U.S. Appl. No. 11/874,579, filed Oct. 18, 2007, Amendment and Response filed Dec. 10, 2013, 17 pgs.
U.S. Appl. No. 12/359,939, Office Action mailed Jan. 2, 2014, 18 pgs.
Canadian Notice of Allowance in Application 2618854, received Jan. 13, 2014, 1 pg.
Chinese Notice of Allowance in Application 2009801129286, mailed Aug. 30, 2013, 4 pgs.
U.S. Appl. No. 12/569,028, Notice of Allowance mailed Feb. 21, 2014, 8 pgs.
U.S. Appl. No. 13/360,536, Office Action mailed Mar. 20, 2014, 14 pgs.
U.S. Appl. No. 11/874,579, Office Action mailed Mar. 28, 2014, 30 pgs.
Japanese Final Notice of Reason for Rejection in Application 2011-527079, mailed May 5, 2014, 6 pgs.
U.S. Appl. No. 12/791,756, Amendment and Response after Allowance filed Apr. 4, 2014, 3 pgs.
U.S. Appl. No. 12/207,910, Notice of Allowance mailed Apr. 16, 2014, 19 pgs.
U.S. Appl. No. 12/359,939, Office Action mailed Apr. 9, 2014, 18 pgs.

\* cited by examiner

← 300

304
             ↓
                    COLUMNS 0   1   2   3

A   B   C   ← 302

0       0   1   2   3

1   C   1   2   3   2

ROWS    2   B   2   3   2   3

404　　　COLUMNS

|   | 0 | 1 | 2 | 3 |
|---|---|---|---|---|
|   |   | A | B | C |
| 0 |   | 0 | 1 | 2 | 28 |
| 1 | A | 1 | 0 | 1 | 27 |
| 2 | B | 2 | 1 | 0 | 26 |

ROWS (label for rows axis); 402 points to the top header row.

*FIG. 4*

SEARCH RESULTS RANKING USING EDITING DISTANCE AND DOCUMENT INFORMATION

CROSS-REFERENCE TO RELATED APPLICATIONS

This application is related to pending U.S. patent application Ser. No. 11/874,844 entitled "Enterprise Relevancy Ranking Using A Neural Network" and filed Oct. 18, 2007, now U.S. Pat. No. 7,840,569, issued Nov. 23, 2010, the entirety of which is incorporated by reference herein.

BACKGROUND

In a typical search engine service a user can enter a query by selecting the topmost relevant documents out of an indexed collection of URLs (universal resource locators) that match the query. To serve the queries quickly the search engine utilizes one or more methods (e.g., an inverted index data structure) that map keywords to documents. For example, a first step performed by the engine can be to identify the set of candidate documents that contain the keywords specified by the user query. These keywords can be located in the document body or the metadata, or additional metadata about this document that is actually stored in other documents or datastores (such as anchor text).

In a large index collection the cardinality of the candidate document set can be big, depending on the commonality of the query terms (e.g., potentially millions). Instead of returning the entire set of candidate documents the search engine performs a second step of ranking of the candidate documents with respect to relevance. Typically, the search engine utilizes a ranking function to predict the degree of relevance of a document to a particular query. The ranking function takes multiple features from the document as inputs and computes a number that allows the search engine to sort the documents by predicted relevance.

The quality of the ranking function with respect as to how accurately the function predicts relevance of a document is ultimately determined by the user satisfaction with the search results or how many times on average the user finds the answer to the question posed. The overall user satisfaction with the system can be approximated by a single number (or metric), because the number can be optimized by varying the ranking function. Usually, the metrics are computed over a representative set of queries that are selected up front by random sampling of the query logs, and involve assigning relevance labels to each result returned by the engine for each of the evaluation queries. However, these processes for document ranking and relevance are still inefficient in providing the desired results.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The architecture provides a mechanism for extracting document information from documents received as search results based on a query string and computing an edit distance between a data string and the query string. The data string can be a short and accurate description of the document obtained from document information such as TAUC (title, anchor text, URL (uniform resource locator), and clicks), for example. The edit distance is employed in determining relevance of the document as part of result ranking. The mechanism improves the relevance of search results ranking be employing a set of proximity-related features to detect near-matches of a whole query or part of the query.

The edit distance is processed to evaluate how close the query string is to a given data stream that includes the document information. The architecture includes the index-time splitting of compound terms in the URL to allow the more effective discovery of query terms. Additionally, index-time filtering of anchor text is utilized to find the top N anchors of one or more of the document results. Using the TAUC information can be input to a neural network (e.g., 2-layer) to improve relevance metrics for ranking the search results.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

BRIEF DESCRIPTION OF THE DRAWINGS

FIG. 3 illustrates processing and generating edit distance values based on a query string and data string using the modified edit distance and matching algorithm.

FIG. 4 illustrates another example of processing and generating edit distance values based on a query string and data string using the modified edit distance and matching algorithm.

DETAILED DESCRIPTION

Figure 1:
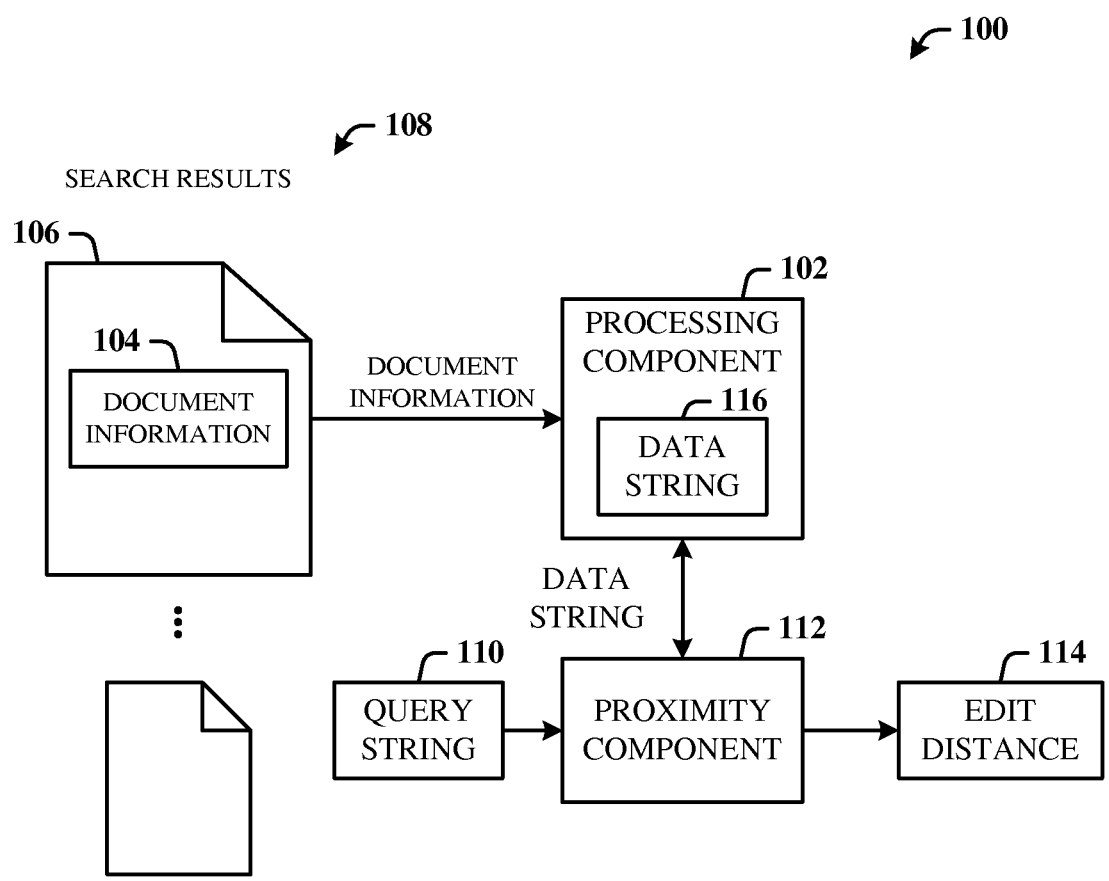
FIG. 1 illustrates a computer-implemented relevance system.

The disclosed architecture improves the relevance of search results ranking by implementing a set of proximity-related features to detect near-matches of a whole query or matches with accurate metadata about the document, such as titles, anchors, URLs, or clicks. For example, consider a query "company store", a document title "company store online" of a first document and a document title "new NEC LCD monitors in company store" of a second document. Assuming other properties is same for both the first and second documents, the architecture assigns a score for a document based on how much editing effort is devoted to make a chosen stream match the query. In this example, the document title is selected for evaluation. The title of first document requires only one delete operation (delete the term "online") to make a full match, while the title of second document requires five deletes (delete the terms "new", "NEC", "LCD", "monitors" and "in"). Thus, the first document is computed to be more relevant.

The title is one element of TAUC (title, anchor, URL, and clicks) document information for which processing can be applied to some streams of data (e.g., a URL) so that query terms can be found from compound terms. For example, consider, again, the query "company store", and the URL is "www.companystore.com". The result is that the URL is split into four parts (or terms): "www", "company", "store", and "com".

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented relevance system 100. The system 100 includes a processing component 102 for extracting document information 104 from a document 106 received as search results 108 based on a query string 110. The system 100 can also include a proximity component 112 for computing the edit distance 114 between a data string 116 derived from the document information 104 and the query string 110. The edit distance 114 is employed in determining relevance of the document 106 as part of the search results 108.

The document information 104 employed to generate the data string 116 can include title information (or characters), link information (e.g., URL characters), click stream information, and/or anchor text (or characters), for example. The processing component 102 splits compound terms of the document information 104 at index time to compute the edit distance 114. The processing component 102 also filters document information such as anchor text at index time to compute a top-ranked set of anchor text.

The computing of the edit distance 114 is based on insertion and deletion of terms to increase proximity (bring closer) between the data string 116 and the query string 110. The computing of the edit distance 114 can also be based on costs associated with insertion and deletion of terms to increase the proximity (bring closer) between the data string 116 and the query string 110.

Consider a scenario of generating a data string 116 (e.g., TAUC) based on the insertion and/or deletion of terms from the query string 110. This term processing can be performed according to four operations: insert a non-query word into the query string 110; insert a query term into the query string 110; delete a TAUC term from the query string 110; and/or, delete a non-TAUC term from the query string 110.

The edit distance 114 is based on the insertion and deletion operations, but not substitution. There can be two types of cost defined for insertion. Consider a scenario of generating the data string 116 from the query string 110. In the generation, a word can be inserted into the query string 110, which exists in the original query string 110, then the cost is defined as one; otherwise, the cost is defined as w1 (≥1). Here, w1 is a weighting parameter that is tuned. For example, if the query string 110 is AB, then the cost of generating the data string of ABC is higher than that of the data string ABA. The intuition is that by inserting "irrelevant words" into the data string 116 makes the entire data string 116 (e.g., TAUC) more irrelevant.

There can be two types of cost for deletion. Again, consider a scenario of generating the data string 116 from the query string 110. When deleting a term in the query string 110, which term exists in the original data string 116, then the cost is defined as one; otherwise, the cost is defined as w2 (≥1).

Another type of cost is a position cost. If a deletion or insertion occurs at the first position of the data string 116, then there is an additional cost (+w3). The intuition is that a matching at the beginning of the two strings (query string 110 and data string 116) is given greater importance than matches later in the strings. Consider the following example where the query string 110 is "cnn", and the data string 116 is title="cnn.com–blur blur". If insertion and deletion occur at the first position, it can significantly reduce the effectiveness of the solution.

Figure 2:
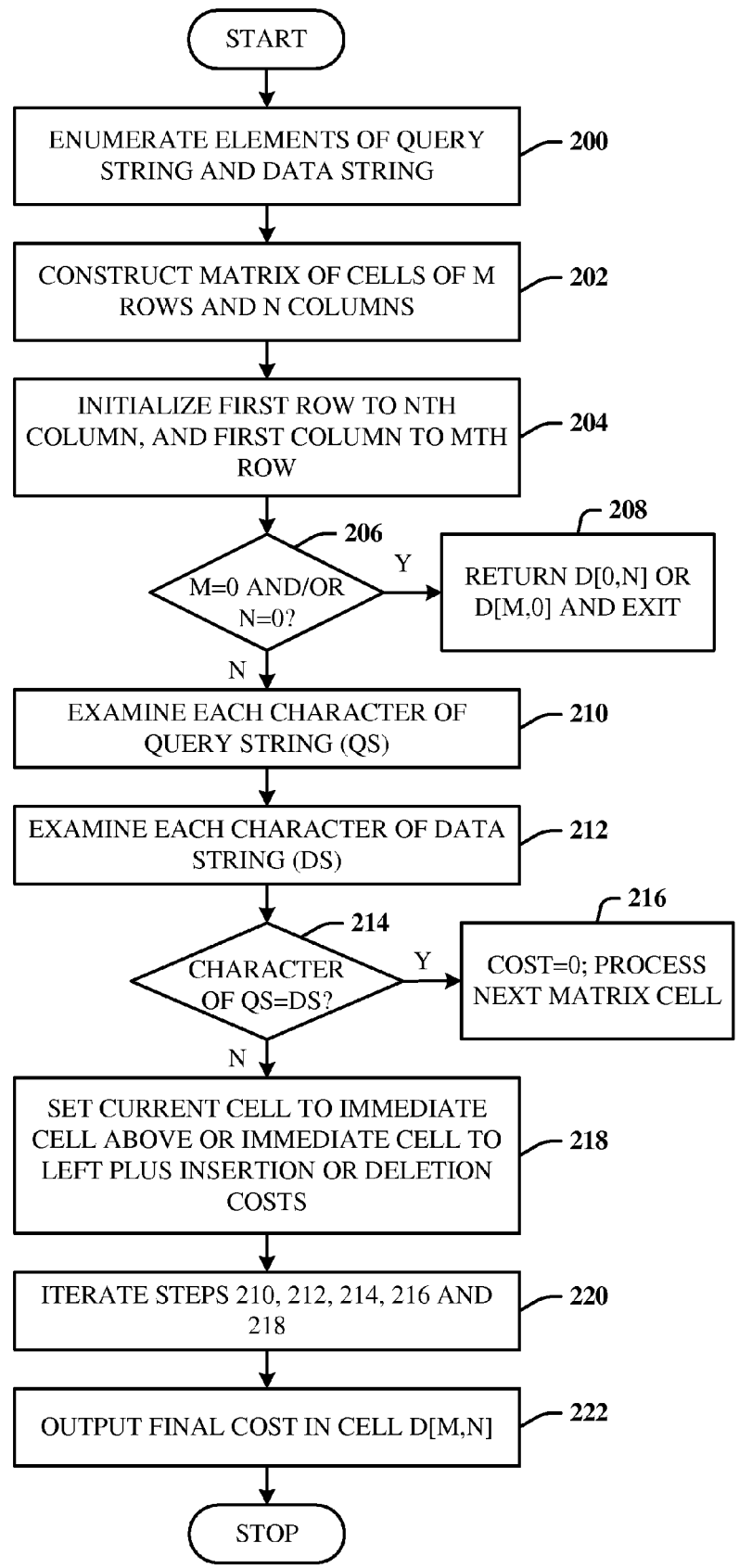
FIG. 2 illustrates a flow chart of an exemplary the matching algorithm for computing edit distance.

FIG. 2 illustrates a flow chart of an exemplary the modified matching algorithm 200 for computing edit distance. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 200, elements of the query string and the data (or target) string are enumerated. This is accomplished by setting n to be the length of the query string (where each term in query string is s[i]), and setting m to be the length of the target (or data) string (where each term in target string is denoted t[j]). At 202, a matrix is constructed that contains 0 . . . m rows and 0 . . . n columns (where each term in the matrix is denoted as d[j,i]). At 204, the first row is initialized with a value that depends on the different cost of deletion and the first column is initialized with a value that depends on the different cost of insertion. At 206, if n=0, return d[m, 0] and exit, and if m=0, return d[0, n] and exit, as indicated at 208. At 210, each character of the query string is examined (i from 1 to n). At 212, each character of the target data string is examined (j from 1 to m). At 214, if the character string in the query string equals the character in the data string, flow is to 216 where the cost is zero and the next matrix cell is processed. In other words, if s[i] equals t[j], the cost is 0 and d[j,i]=d[j−1,i−1].

If the character in the query string cell is not equal to the character in the data string cell, flow is from 214 to 218 where the current cell is set to the immediate cell above or immediate cell to the left, plus the insertion or deletion cost. In other words, if s[i] is not equal to t[j], set cell d[j,i] of the matrix equal to the minimum of the cell immediately above plus corresponding insertion cost represented d[j−1,i]+cost_insertion) or the cell immediately to the left plus corresponding deletion cost (represented d[j,i−1]+cost_deletion). At 220, the steps 210, 212, 214, 216 and 218 are iterated to completion. At 222, final cost found in cell d[m, n] is output. Note that both the cost_insertion and the cost_deletion in the example have two kinds of values; for example w1=1, w3=4 for insertion cost, and w2=1, w4=26 for deletion cost.

In other words, d[j,i] contains the edit distance between strings s[0 . . . i] and t[0 . . . j]. d[0,0]=0 by definition (no edits needed to make an empty string equal to empty string). d[0, y]=d[0,y−1]+(w2 or w4). If it is known how many edits are used to make the string d[0,y−1], then d[0,y] can be calculated as d[0, y−1]+cost of deleting current character from the target string, which cost can be w2 or w4. The cost w2 is used if the current character is present in both s[0 . . . n], t[0 . . . m]; and w4, otherwise. d[x, 0]=d[x−1,0]+(w1 or w3). If it is known how many edits are used to make the string d[x−1,0] then d[x,0] can be calculated as d[x−1,0]+cost of insertion of the current character from s to t, which cost can be w1 or w3. The cost w1 is used if the current character is present in both s[0 . . . n], t[0 . . . m]; and w3, otherwise.

For each (j,i), d[j,i] can be equal to d[j−1,i−1] if s[i]=t[j]. The edit distance can be computed between strings t[j−1], s[i−1], and if s[i]=t[j], a common character can be appended to both strings to make the strings equal, without causing edits. Thus, there are three moves employed, where the move that provides the minimal edit distance for current d[j,i] is selected. Put another way,

```
d[j,i] = min(
    d[j−1,i−1] if s[i]=t[j];
    d[j−1,i] + (w1, if s[j] is present in both strings; else, w3);
    d[j,i−1] + (w2, if t[i] is present in both strings; else, w4)
    )
```

Figure 3:
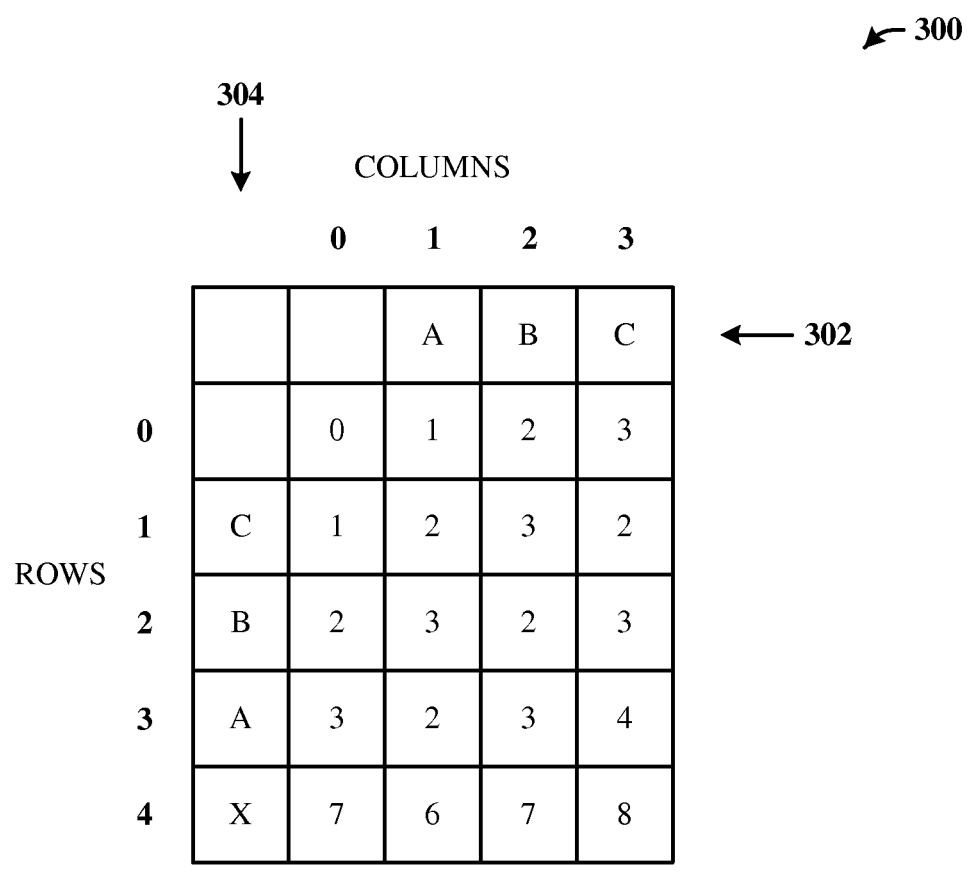

FIG. 3 illustrates processing and generating edit distance values based on a query string and data string using the modified edit distance and matching algorithm. The process involves one or more of left-right, top-down, and diagonal computations. A query string of terms "A B C" is processed against with a target data string of terms "C B A X" (where X denotes a term not in the query string). The process for computing an edit distance can be performed in different ways; however, the specific details for performing a modified version of an edit distance is different as computed according to the disclosed architecture. A 4×5 matrix 300 is constructed based on n×m where n=3 for the query string and m=4 for the data string. The query string 302 is placed along the horizontal axis and the target data string 304 is along the vertical axis of the matrix 300.

The description will use the matrix 300 denoted with four columns (0-3) and five rows (0-4). Applying the edit distance matching algorithm described in FIG. 2 from left to right beginning in row 0, column 0, the intersecting cell d[0,0] receives "0" since the compare of the empty cell of the query string ABC to the empty cell of the target data string CBAX does not cause insertion or deletion of a term to make the query string the same as the target data string. The "terms" are the same so the edit distance is zero.

Moving right to compare the A term of query string 302 to the empty cell of row 0 uses one deletion to make the strings the same; thus, the cell d[0,1] receives a value of "1". Moving right again to the column 2, the compare is now made between terms AB of the query string 302 to the empty cell of the target data string column. Thus, two deletions in the query string 302 are used to make the strings the same resulting in an edit distance of "2" being placed into cell d[0,2]. The same process applies to column 3 where the terms ABC of the query string 302 are compared to the empty cell in target string column, using three deletions to make the strings alike, resulting in an edit distance of "3" in the cell d[0,3].

Dropping down to row 1 and continuing left to right, the empty cell of the query string row is compared to the first term C of the target data string 304. One deletion is used to make the strings the same, with an edit distance of "1" in d[1,0]. Moving right to column 1, the compare is made between the A term of the query string 302 and the C term of the target data string 304. A deletion and insertion is used to make the strings alike, thus, a value of "2" is inserted into cell d[1,1]. Skipping to the last cell d[1,3], the matching process for matching ABC to C results in using two deletions for an edit distance of "2" in the cell d[1,3]. Moving to row 4 and column 3 for brevity and to find the overall edit distance, matching terms ABC to terms CBAX results in an edit distance of "8" in cell d[4,3] using insertion/deletion in the first term C of the target string for a value of "2", a value of "0" for the match between the B terms, an insertion/deletion for the match of the third terms C and A for a value of "2", an insertion of the term X for a value of "1" and a value of "3" for position cost, resulting in a final edit distance value of "8" in cell d[4,3].

FIG. 4 illustrates another example of processing and generating edit distance values based on a query string and target data string using the modified edit distance and matching algorithm. Here, a matrix 400 is generated for comparing a query string 402 of ABC to a target data string 404 of AB based on weightings for cost_insertion of w1=1, w3=4 for insertion cost, and w2=1 and w4=26 for deletion cost. In other words, working row 0 from left to right, matching term A of the query string 402 to the empty cell before the target string 404 results in one insertion in the target string 404 of the term A for a value of "1" cell d[0,1]. Matching terms AB of the query string 402 to the empty cell before the target string 404 results in two insertions in the target string 404 of the terms AB for a value of "2" cell d[0,2], and matching terms ABC of the query string 402 to the empty cell before the target string 404 results in the two insertions in the target string 404 of the terms AB value plus value w4=26 for the term C for a value of "28" in cell d[0,3], since the term C is not in both strings.

Working row 1 from left to right (understanding that d[1, 0]=1), matching term A of the query string 402 to the term A of the target string 404 results in equality in the target string 404 and the query string 402 for a value of "0" in cell d[1,1], by taking the value from d[j−1,i−1]=d[0,0]="0". Matching terms AB of the query string 402 to the term A of the target string 404 results in one insertion in the target string 404 for the term B for a minimum value of "1" cell d[1,2]. Matching terms ABC of the query string 402 to term A of the target string 404 for the cell d[1,3] results in a minimum value associated with the value of d[j−1,i]=d[0,3] plus w3 for a value of "28" in cell d[1,3] compared to a value of d[j,i−1]=d[1,2] for 1 plus 26 for 27, since the term C is not in both strings, resulting in the minimum value of "27" in d[1,3].

Working row 2 from left to right, matching term A of the query string 402 to the terms AB of the target string 404 results in a deletion in the target string 404 for a value of "1" in cell d[2,1]. Matching terms AB of the query string 402 to the terms AB of the target string 404 for the distance in cell d[2,2] results in an equality, thereby pulling the value from d[j−1,i−1]=d[1,1] as the value "0" for cell d[2,2]. Matching terms ABC of the query string 402 to terms AB of the target string 404 for the cell d[2,3] results in a minimum value associated with the value of d[j−1,i]=d[1,3]=27 plus w3=1 for a value of "28" compared to, since C is not in the target string (also based on a value of d[i,j−1]=d[2,2]=0 plus 26 for 26, since the term C is not in both strings, for the minimum value of "26" in d[2,3].

Figure 5:
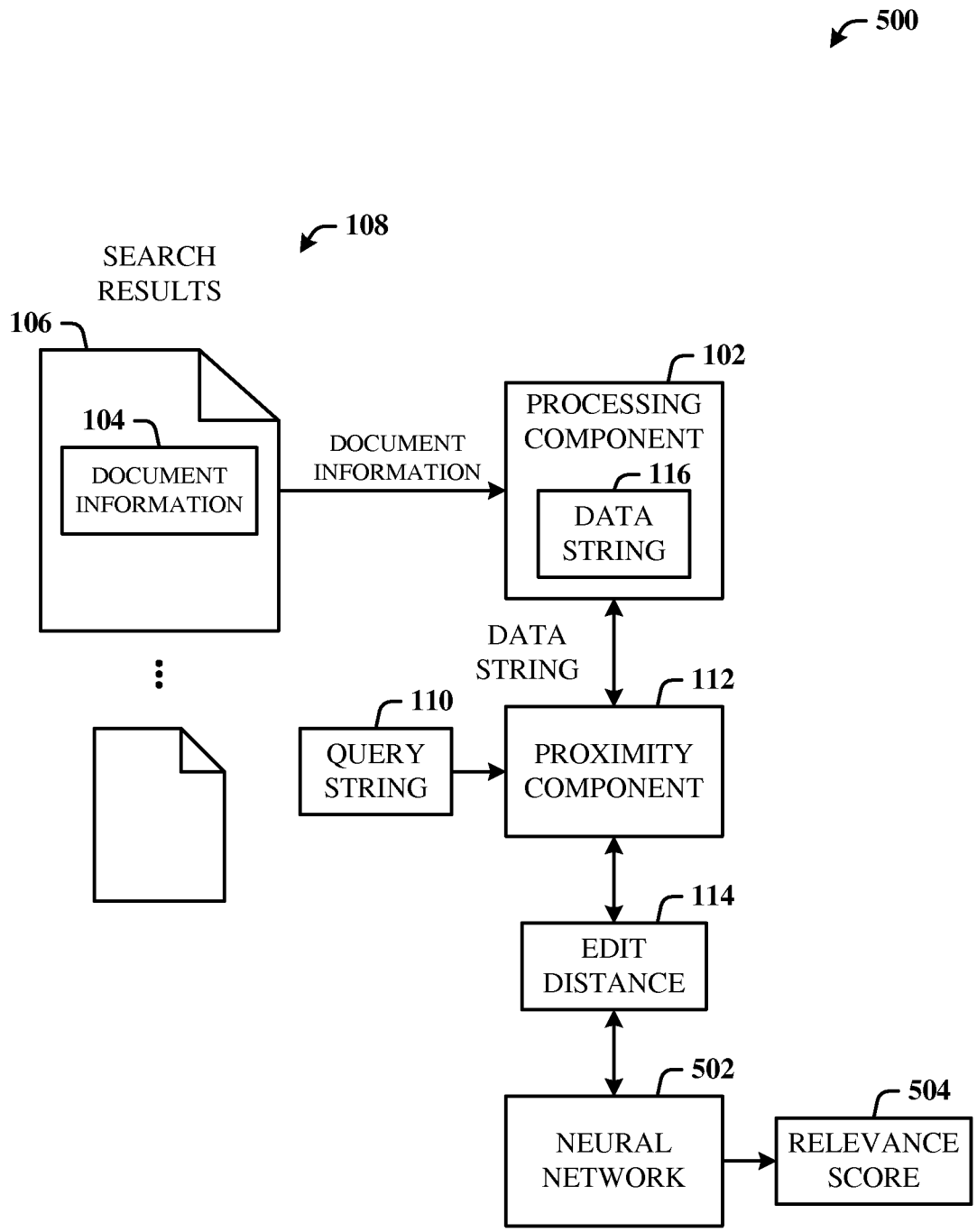
FIG. 5 illustrates a computer-implemented relevance system that employs a neural network to assist in generating a relevance score for the document.

FIG. 5 illustrates a computer-implemented relevance system 500 that employs a neural network 502 to assist in generating a relevance score 504 for the document 106. The system 500 includes the processing component 102 for extracting document information 104 from the document 106 received as the search results 108 based on the query string 110, and the proximity component 112 for computing the edit distance 114 between the data string 116 derived from the document information 104 and the query string 110. The edit distance 114 is employed in determining relevance of the document 106 as part of the search results 108.

The neural network 502 can be employed to receive the document information 104 as an input for computing a relevance score for the document 106. Based solely or in part on the relevance scores for some or all of the search results 108, the documents in the search results 108 can be ranked. The system 500 employs the neural network 502 and codebase to generate the relevance score for ranking of the associated document in the search results 108.

Following is a description of the edit distance algorithm for calculating the edit distance between the query string and each of the data strings to obtain a TAUC score for each pair.

Because there is only one title in a document, the TAUC score can be calculated with respect to title as follows:

TAUC(Title)=ED(Title)

where TAUC(Title) is later used as an input to the neural network after application of a transform function, and ED(Title) is the edit distance of the title.

There can be multiple instances of anchor text for a document, as well as URLs and clicks (where a click is a previously executed query for which this document was clicked on). The idea is that this document is more relevant for similar queries. At index time, the N anchor texts having the highest frequencies are selected. Then the ED score is calculated for each selected anchor. Finally, the TAUC score is determined for an anchor as follows:

TAUC(Anchor)=Min{ED($Anchor_i$)} i: top N anchors;

The intuition is that if a good match exists with one of the anchors, then it is sufficient. TAUC(Anchor) is used as a neural network input after applying a transform function.

Special processing is utilized before calculating the ED for URL strings. At index time URL strings are split into parts using a set of characters as separators. Then terms are found in each part from a dictionary of title and anchor terms. Each occurrence of a term from dictionary is stored in an index with the position measured in characters from the beginning of the URL string.

At query time all occurrences of the query terms are read from the index stored at index time and the breaks are filled in with "non-query" terms. After this processing the ED is calculated. The result of ED processing is a neural network input, after application of a transform function.

Another property that can be processed is the number of "clicks" the user enters for a given document content. Each time a user clicks on the document, a stream is entered into a database and associated with the document. This process can also be applied to stream data in the document information text such as short streams of data.

The index-time URL processing algorithm splits the entire URL into parts using a set of characters as separators. The split function also sets urlpart.startpos to a position of part in the source string. The split function performs filtering of insignificant parts of the URL.

For example, "http://www.companymeeting.com/index.html" is filtered into "companymeeting/index" and split into "companymeeting" and "index".

```
Startpos: 0
Urlparts = split(url, dictionary)
// find terms in different url parts.
For each (term in dictionary)
{
    Int pos = 0;
    For each(urlpart in urlparts)
    {
        pos = urlpart.Find(term, pos);
        while (pos >= 0)
        {
            // parts_separator is used to distinguish different parts
at query time
            storeOccurrence(term, pos +
urlpart.startpos*parts_separator);
            pos = url.Find(term, pos + term.length);
        }
    }
    setIndexStreamLength(parts_separator * urlparts.Count);
}
```

Assuming the dictionary contains "company meeting comp", the following keys can be generated: Company: 0; Meeting: 7; and Comp: 0. The total length of the string is parts_separator*2.

With respect to query-time processing before ED, at query time the occurrences of the query terms are read, a string of query terms constructed in the order of appearance in the source URL string, and space between the terms filled in with "non-query" word marks. For example, consider a query string of "company policy" and a resulting string of "company" "non-query term" "non-query term".

A parts_separator, query term positions, and stream length are determined to know how many parts are in the original URL string and what part contains a given query. Each part without terms is deemed to contain a "non-query term". If a part does not start with a query term, a "non-query term" is inserted before the term. All spaces between query terms are filled with "non-query terms".

Figure 6:
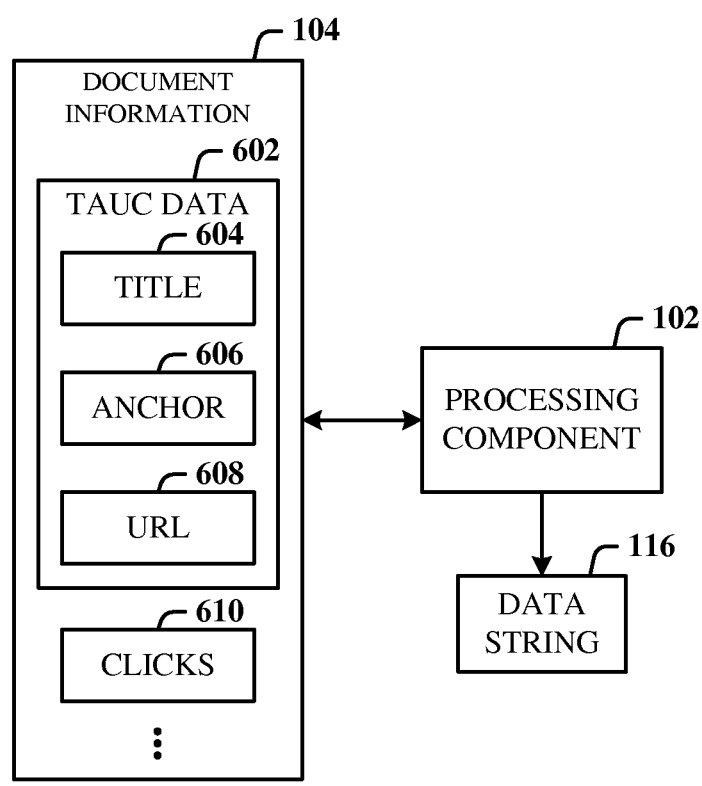
FIG. 6 illustrates the types of data that can be employed in the document information for determining the edit distance between the query string and the data string.

FIG. 6 illustrates the types of data that can be employed in the document information 104 for determining the edit distance between the query string and the data string. The document information 104 can include TAUC data 602, such as title text 604, anchor text 606, URL 608 text or characters, and click information 610, for example, for processing by the processing component 102 and generation of the data (or target) string 116. The document information 104 can also include click information 610 related to the number of times a user clicks on document content, the type of content the user selects (via the click), the number of clicks on the content, the document in general, etc.

Figure 7:
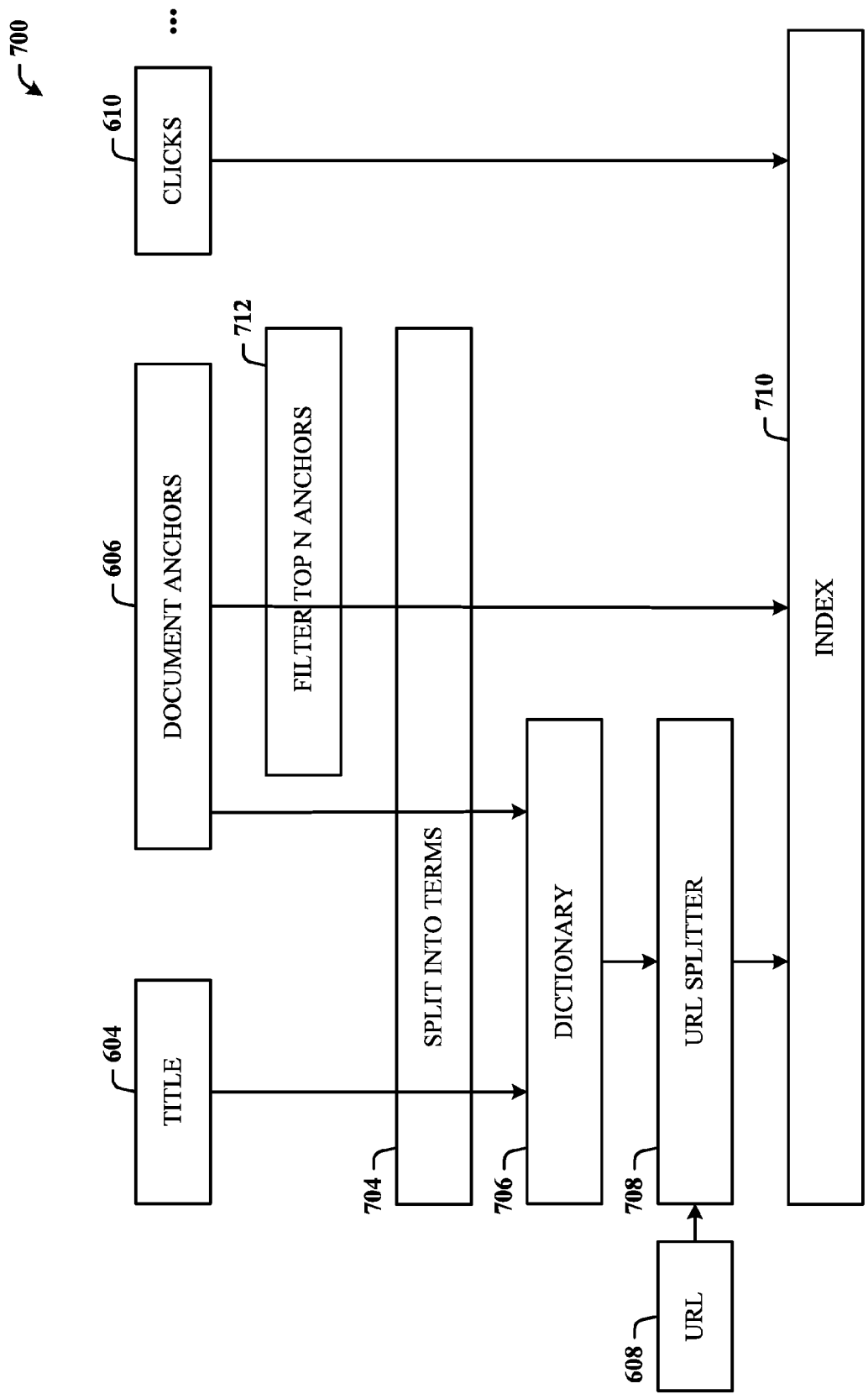
FIG. 7 illustrates an index-time processing data flow.

FIG. 7 illustrates an index-time processing data flow 700. At the top, document information in the form of the title 604, document anchors 606, click information 610, etc., are received based on document analysis and extraction. The title 604 is processed through a term-splitting algorithm 704 and then to a dictionary 706. The dictionary 706 is a temporary storage of different terms found in the title 604, anchors 606, click information 610, etc. The dictionary 706 is used to split the URL 608 via a URL splitting algorithm 708. The output of the URL splitting algorithm 708 is sent to an indexing process 710 for relevance and ranking processing. The document anchors 606 can also be processed through a filter 712 for the top N anchors. The click information 610 can be processed directly via the indexing process 710. Other document information can be processed accordingly (e.g., term splitting, filtering, etc.).

Figure 8:
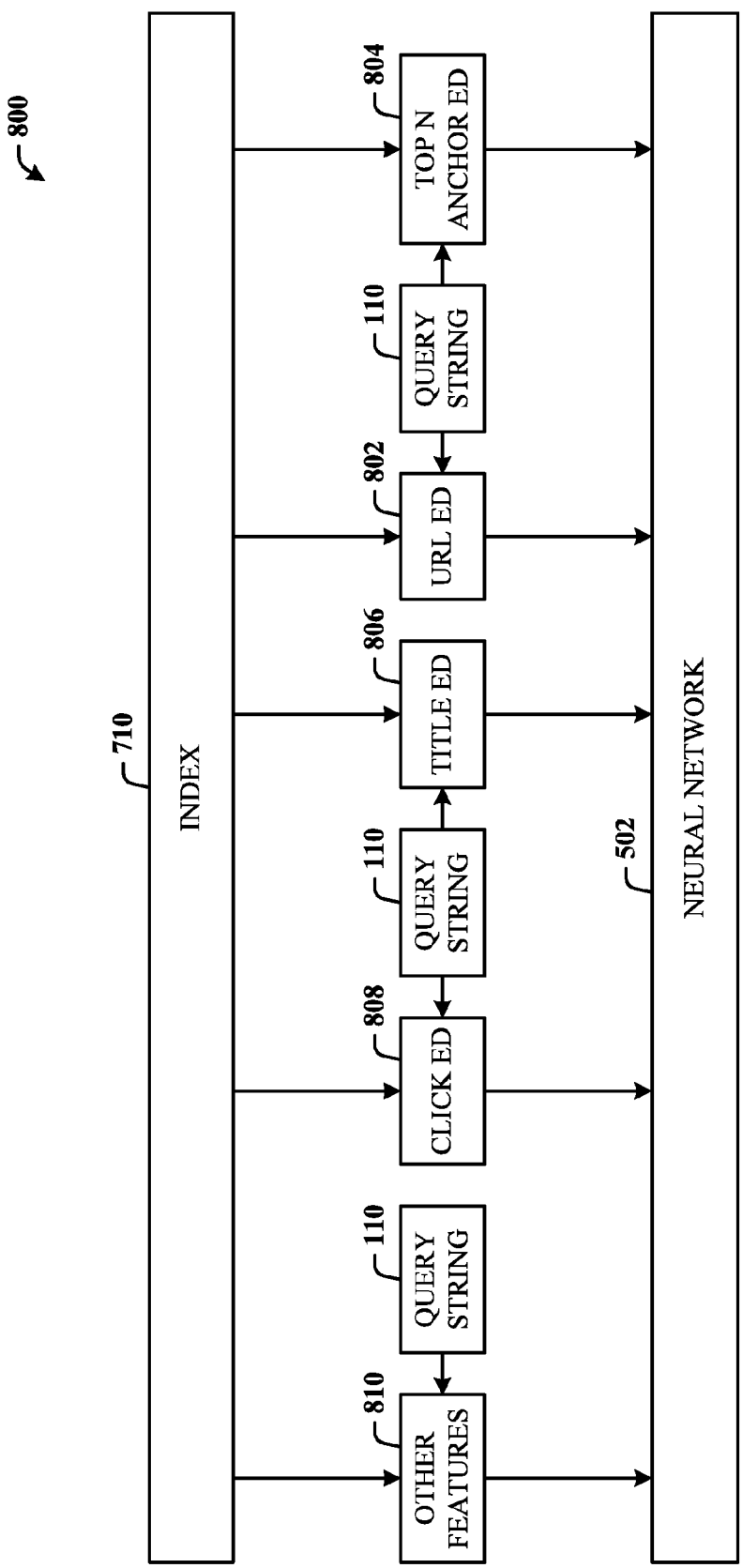
FIG. 8 illustrates a block diagram showing inputs to the neural network from the index process of FIG. 7 for result ranking.

FIG. 8 illustrates a block diagram 800 showing inputs to the neural network from the index process 710 of FIG. 7 for result ranking. The indexing process 710 can be used for computing a URL edit distance (ED) 802 relative to the query string 110, a top-N-anchors ED 804 relative to the query string 110, a title ED 806 relative to the query string 110, a click ED 808 relative to the query string 110, as well as other features 810 not related to edit distance, some or all of which (URL ED 802, top-N-anchors ED 804, title ED 806, click ED 808, and other features 810) can be employed as inputs to the neural network 502, ultimately to find the relevance score for the associated document, and then ranking of the document among other document search results. The neural network 502 can be a 2-layer model that receives at least the TAUC features as raw input features that contribute to identifying relevance of the document. The neural network determines how these features are combined into a single number that can be used for sorting by the search engine.

It is to be appreciated that the neural network 502 is just one example of mathematical or computational models that can be employed for the relevance and ranking processing. Other forms of statistical regression can be employed such as naive Bayes, Bayesian networks, decision trees, fuzzy logic models, and other statistical classification models representing different patterns of independence can be employed, where classification is inclusive of methods used to assign rank and/or priority.

Figure 9:
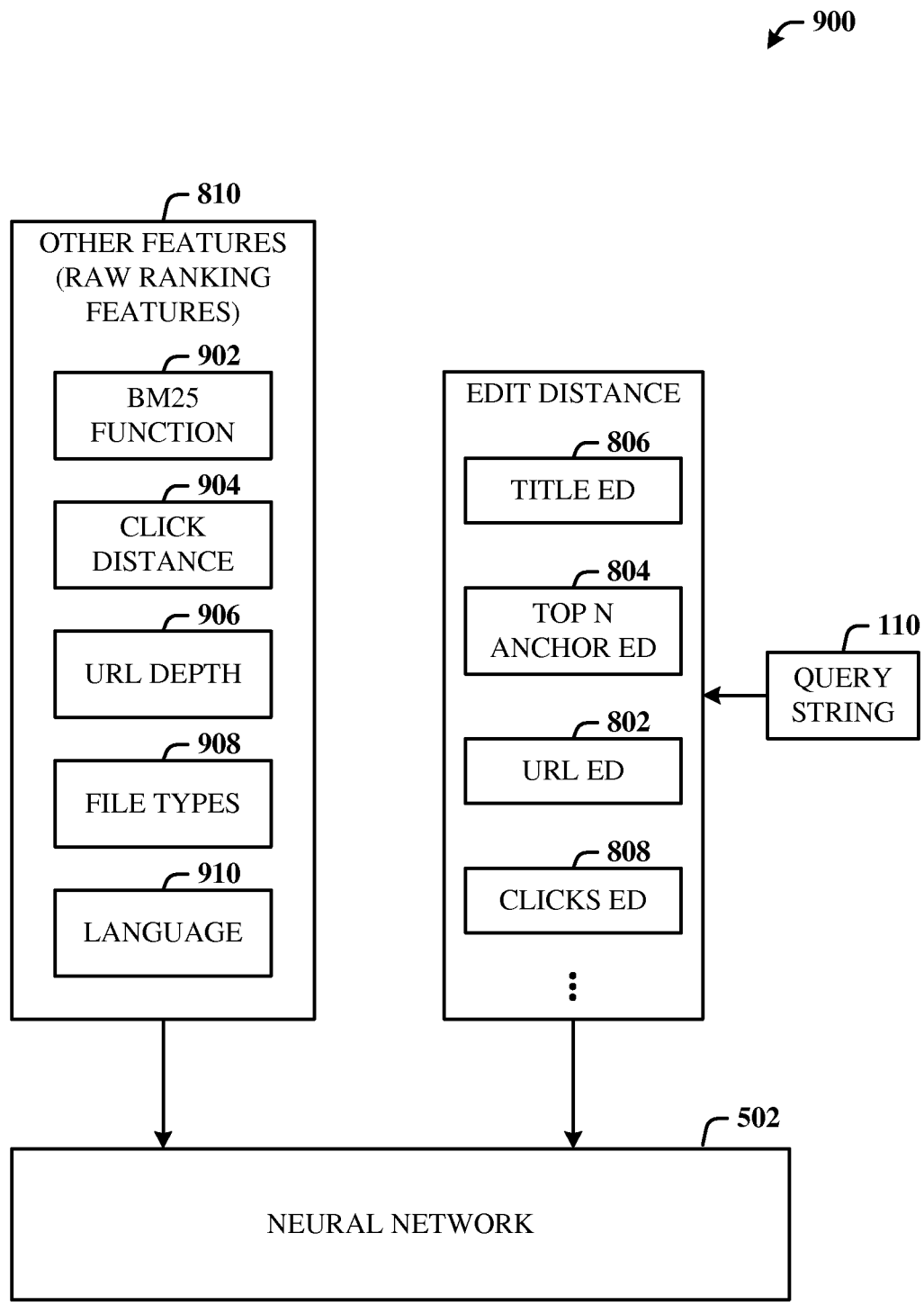
FIG. 9 illustrates an exemplary system implementation of a neural network, edit distance inputs and raw feature inputs for computing generating search results.

FIG. 9 illustrates an exemplary system 900 implementation of the neural network 502, edit distance inputs and raw feature inputs for computing generating search results. The set of raw ranking features 810 on the input(s) of the neural network 502 can include a BM25 function 902 (e.g., BM25F), click distance 904, URL depth 906, file types 908, and language match 910. The BM25 components can include body, title, author, anchor text, URL display name, and extracted title, for example.

Figure 10:
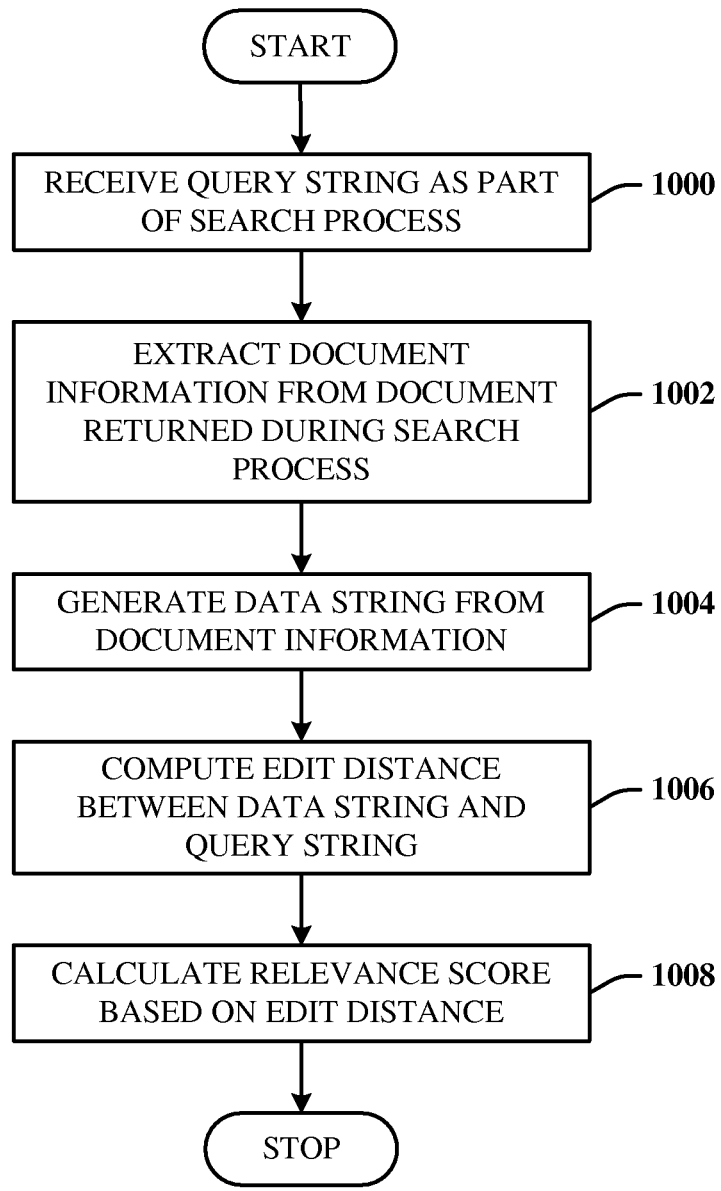
FIG. 10 illustrates a method of determining document relevance of a document result set.

FIG. 10 illustrates a method of determining relevance. At 1000, a query string is received as part of a search process. At 1002, document information is extracted from a document returned during the search process. At 1004, a data string is generated from the document information. At 1006, the edit distance is computed between the data string and the query string. At 1008, a relevance score is calculated based on the edit distance.

Other aspects of the method can include employing term insertion as part of computing the edit distance and assessing an insertion cost for insertion of a term in the query string to generate the data string, the cost represented as a weighting parameter. The method can further comprise employing term deletion as part of computing the edit distance and assessing a deletion cost for deletion of a term in the query string to generate the data string, the cost represented as a weighting parameter. A position cost can be computed as part of computing the edit distance, the position cost associated with term insertion and/or term deletion of a term position in the data string. Additionally, a matching process is performed between characters of the data string and characters of the query string to compute an overall cost of computing the edit distance.

The splitting compound terms of a URL of the data string can occur at index time. The method can further comprise the filtering of anchor text of the data string to find a top-ranked set of anchor text based on frequency of occurrence in the document and computing an edit distance score for anchor text in the set. The edit distance score, derived from computing the edit distance, can be input into a two-layer neural network after application of a transform function, the score generated based on calculating the edit distance associated with at least one of title information, anchor information, click information, or URL information.

Figure 11:
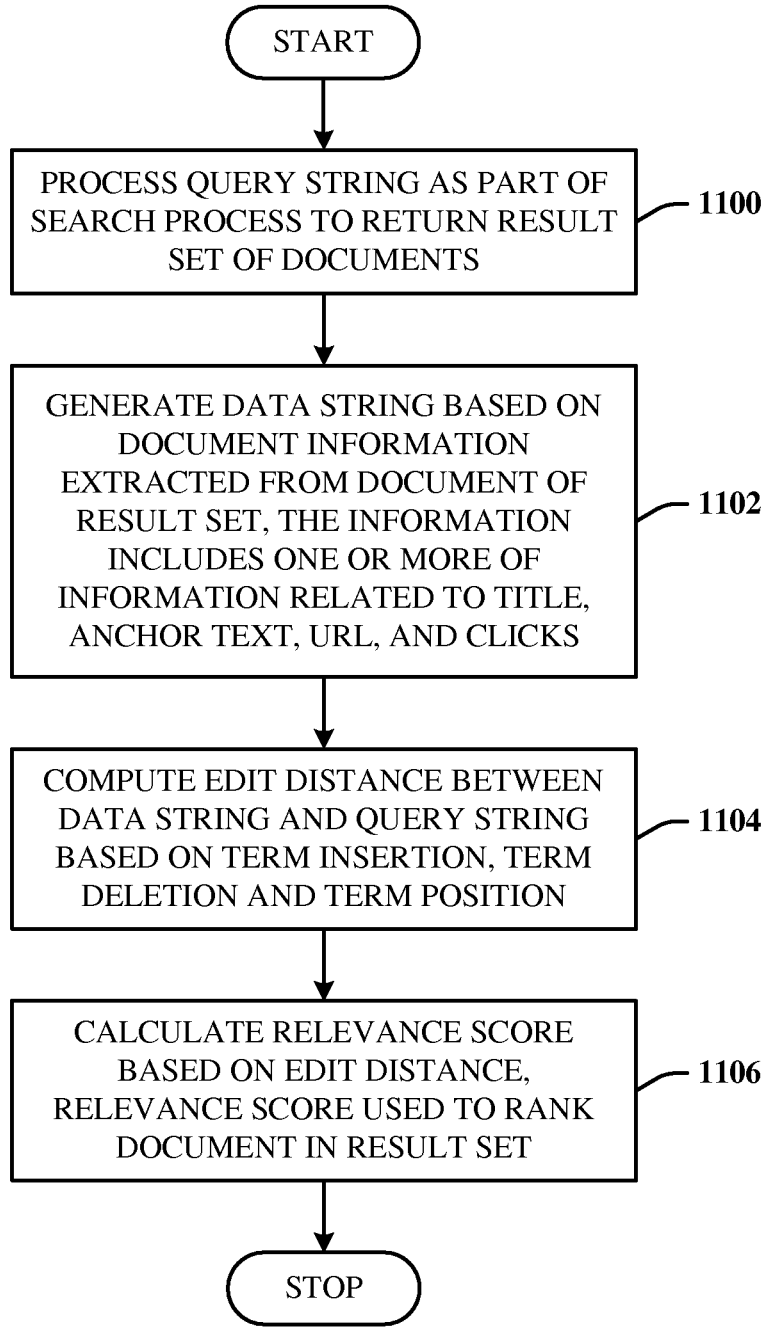
FIG. 11 illustrates a method of computing relevance of a document.

FIG. 11 illustrates a method of computing relevance of a document. At 1100, a query string is processed as part of a search process to return a result set of documents. At 1102, a data string is generated based on the document information extracted from a document of the result set, the document information includes one or more of title information, anchor text information, click information, and URL information from the document. At 1104, the edit distance is computed between the data string and the query string based on term insertion, term deletion, and term position. At 1106, a relevance score is calculated based on the edit distance, the relevance score used to rank the document in the result set.

The method can further comprise computing a cost associated with each of the term insertion, term deletion and term position, and factoring the cost into computation of the relevance score, and splitting compound terms of the URL information at index time and filtering the anchor text information at index time to find a top-ranked set of anchor text based on frequency of occurrence of the anchor text in the document. The reading of occurrences of the terms of the query string can be performed to construct a string of query terms in order of appearance in a source URL string and filling space between the terms with word marks.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 12:
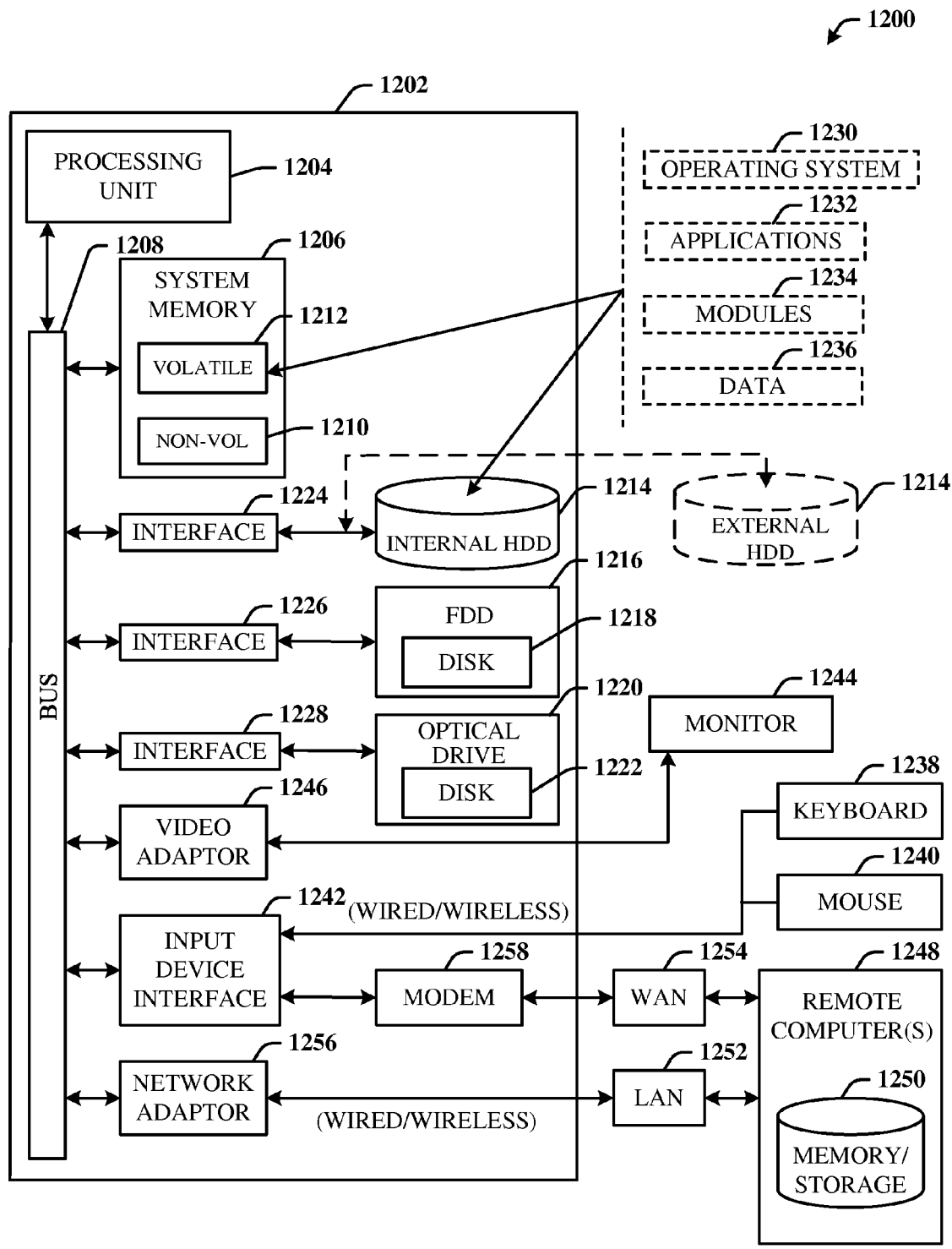
FIG. 12 illustrates a block diagram of a computing system operable to execute edit distance processing for search result ranking using TAUC features in accordance with the disclosed architecture.

Referring now to FIG. 12, there is illustrated a block diagram of a computing system 1200 operable to execute edit distance processing for search result ranking using TAUC features in accordance with the disclosed architecture. In order to provide additional context for various aspects thereof, FIG. 12 and the following discussion are intended to provide a brief, general description of a suitable computing system 1200 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 12, the exemplary computing system 1200 for implementing various aspects includes a computer 1202 having a processing unit 1204, a system memory 1206 and a system bus 1208. The system bus 1208 provides an interface for system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 can include non-volatile memory (NON-VOL) 1210 and/or volatile memory 1212 (e.g., random access memory (RAM)). A basic input/output system (BIOS) can be stored in the non-volatile memory 1210 (e.g., ROM, EPROM, EEPROM, etc.), which BIOS are the basic routines that help to transfer information between elements within the computer 1202, such as during start-up. The volatile memory 1212 can also include a high-speed RAM such as static RAM for caching data.

The computer 1202 further includes an internal hard disk drive (HDD) 1214 (e.g., EIDE, SATA), which internal HDD 1214 may also be configured for external use in a suitable chassis, a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as a DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1212, including an operating system 1230, one or more application programs 1232, other program modules 1234, and program data 1236. The one or more application programs 1232, other program modules 1234, and program data 1236 can include the system 100 and associated blocks, the system 500 and associated blocks, the document information 104, TAUC data 602, click information 610, the data flow 700 (and algorithms), and block diagram 800 (and associated blocks).

All or portions of the operating system, applications, modules, and/or data can also be cached in the volatile memory 1212. It is to be appreciated that the disclosed architecture can be implemented with various commercially available operating systems or combinations of operating systems.

A user can enter commands and information into the computer 1202 through one or more wire/wireless input devices, for example, a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, etc.

A monitor 1244 or other type of display device is also connected to the system bus 1208 via an interface, such as a video adaptor 1246. In addition to the monitor 1244, a computer typically includes other peripheral output devices (not shown), such as speakers, printers, etc.

The computer 1202 may operate in a networked environment using logical connections via wire and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, is connected to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented relevance system, comprising:
   one or more processors; and
   a memory coupled to the one or more processors, the memory storing instructions which, when executed by the one or more processors, cause the one or more processors to:
   extract document information from a document received as search results based on a query string, the document information including a universal resource locator wherein the universal resource locator includes a compound term;
   split the compound term into multiple, separate terms;
   find at least one of the multiple, separate terms in a dictionary of terms;
   generate a target data string based on the extracted document information, the target data string including one of the multiple, separate terms found in the dictionary; and
   compute edit distance between the target data string and the query string, the edit distance employed in determining relevance of a document as part of result ranking.

2. The system of claim 1, wherein the document information includes at least one of a title information, universal resource locator information, click information, or anchor text.

3. The system of claim 1, wherein the compound terms of the document information are split at index time to compute the edit distance relative to the universal resource locator.

4. The system of claim 1, further comprising instructions for filtering anchor text of the document information at index time to compute a top-ranked set of anchor text.

5. The system of claim 1, wherein the document information further includes at least one of title characters, anchor characters, or click characters, and wherein the system further includes a neural network operable to compute the relevance of the document based on the document information and raw input features of a BM25F function, a click distance, a file type, a language and a universal resource locator depth.

6. The system of claim 1, wherein the edit distance is computed based on insertion and deletion of terms to increase proximity between the target data string and the query string.

7. The system of claim 1, wherein the edit distance is computed based on costs associated with insertion and deletion of terms to increase proximity between the target data string and the query string.

8. A computer-implemented method of determining relevance of a document, comprising:
   receiving a query string as part of a search process;
   extracting a universal resource locator from document information included in a document returned during the search process, wherein the universal resource locator includes a compound term;
   generating a target data string from the universal resource locator by splitting the compound term of the universal resource locator into multiple, separate terms and finding at least one of the multiple, separate terms in a dictionary of terms;
   computing edit distance between the target data string and the query string; and
   calculating a relevance score based on the edit distance.

9. The method of claim 8, further comprising employing term insertion as part of computing the edit distance and assessing an insertion cost for insertion of a term in the query string to generate the target data string, the cost represented as a weighting parameter.

10. The method of claim 8, further comprising employing term deletion as part of computing the edit distance and assessing a deletion cost for deletion of a term in the query string to generate the target data string, the cost represented as a weighting parameter.

11. The method of claim 8, further comprising computing a position cost as part of computing the edit distance, the position cost associated with one or more of term insertion and term deletion of a term position in the target data string.

12. The method of claim 8, further comprising performing a matching process between characters of the target data string and characters of the query string to compute an overall cost of computing the edit distance.

13. The method of claim 8, wherein splitting compound terms of the universal resource locator occurs at index time.

14. The method of claim 8, further comprising filtering anchor text of the target data string to find a top-ranked set of anchor text based on frequency of occurrence in the document.

15. The method of claim 14, further comprising computing an edit distance score for anchor text in the set.

16. The method of claim 8, further comprising inputting a score, derived from computing the edit distance, into a two-layer neural network after application of a transform function, the score generated based on calculating the edit distance associated with at least one of title information, anchor information, click information, or universal resource locator information, and other raw input features.

17. A computer-implemented method of computing relevance of a document, comprising:

processing a query string as part of a search process to return a result set of documents;

generating a target data string based on document information extracted from a document of the result set, the document information including a universal resource locator, wherein the universal resource locator includes a compound term, wherein generating the target data string includes splitting the compound term into multiple, separate terms, and finding at least one of the multiple, separate terms in a dictionary of terms;

computing edit distance between the target data string and the query string based on term insertion, term deletion, and term position; and calculating a relevance score based on the edit distance, the relevance score used to rank the document in the result set.

18. The method of claim 17, further comprising computing a cost associated with each term insertion, term deletion and term position, and factoring the cost into computation of the relevance score.

19. The method of claim 17, further comprising splitting compound terms of the universal resource locator information at index time and filtering the anchor text information at index time to find a top-ranked set of anchor text based on frequency of occurrence of the anchor text in the document.

20. The method of claim 17, further comprising reading occurrences of terms of the query string to construct a string of query terms in order of appearance in a source universal resource locator string and filling space between the terms with word marks.

* * * * *